United States Patent
Park et al.

(10) Patent No.: US 12,079,948 B2
(45) Date of Patent: Sep. 3, 2024

(54) MULTIDIMENTIONAL IMAGE EDITING FROM AN INPUT IMAGE

(71) Applicant: ADOBE INC., San Jose, CA (US)

(72) Inventors: Taesung Park, San Francisco, CA (US); Richard Zhang, San Francisco, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 90 days.

(21) Appl. No.: 17/942,101

(22) Filed: Sep. 9, 2022

(65) Prior Publication Data

US 2024/0087265 A1   Mar. 14, 2024

(51) Int. Cl.
| | |
|---|---|
| *G06T 19/20* | (2011.01) |
| *G06F 3/04847* | (2022.01) |
| *G06F 40/284* | (2020.01) |
| *G06F 40/289* | (2020.01) |
| *G06V 10/774* | (2022.01) |
| *G06V 10/776* | (2022.01) |
| *G06V 10/82* | (2022.01) |

(52) U.S. Cl.
CPC .......... *G06T 19/20* (2013.01); *G06F 3/04847* (2013.01); *G06F 40/289* (2020.01); *G06V 10/774* (2022.01); *G06V 10/776* (2022.01); *G06V 10/82* (2022.01); *G06F 40/284* (2020.01); *G06T 2200/24* (2013.01); *G06T 2210/61* (2013.01)

(58) Field of Classification Search
None
See application file for complete search history.

(56) References Cited

U.S. PATENT DOCUMENTS

| | | | |
|---|---|---|---|
| 2018/0268548 A1* | 9/2018 | Lin | G06N 3/084 |
| 2020/0184605 A1* | 6/2020 | Vogels | G06N 3/045 |
| 2022/0058332 A1* | 2/2022 | Ke | G06F 18/214 |
| 2022/0358719 A1* | 11/2022 | Cao | G06V 40/176 |
| 2023/0073991 A1* | 3/2023 | Miller, IV | G06F 3/012 |

OTHER PUBLICATIONS

Chan, E. R., et al., "Efficient Geometry-aware 3D Generative Adversarial Networks", arXiv:2112.07945v1, pp. 1-28 (Dec. 15, 2021).

(Continued)

*Primary Examiner* — Edward Martello
(74) *Attorney, Agent, or Firm* — Shook, Hardy & Bacon L.L.P.

(57) ABSTRACT

Various disclosed embodiments are directed to changing parameters of an input image or multidimensional representation of the input image based on a user request to change such parameters. An input image is first received. A multidimensional image that represents the input image in multiple dimensions is generated via a model. A request to change at least a first parameter to a second parameter is received via user input at a user device. Such request is a request to edit or generate the multidimensional image in some way. For instance, the request may be to change the light source position or camera position from a first set of coordinates to a second set of coordinates.

20 Claims, 9 Drawing Sheets

(56) References Cited

OTHER PUBLICATIONS

Chan, E. R., et al., "pi-GAN: Periodic Implicit Generative Adversarial Networks for 3D-Aware Image Synthesis", In Proceedings of the IEEE/CVF Conference on Computer Vision and Pattern Recognition, pp. 5799-5809 (2021).
Feng, Y., et al., "Learning an Animatable Detailed 3D Face Model from In-The-Wild Images", ACM Transactions on Graphic (TOG), vol. 40, No. 4, Article 88, pp. 1-13 (Aug. 2021).
Gal, R., et al., "StyleGAN-NADA: CLIP-Guided Domain Adaptation of Image Generators", arXiv:2108.00946v2, pp. 1-25 (Dec. 16, 2021).
Garon, M., et al., "Fast Spatially-Varying Indoor Lighting Estimation", In Proceedings of the IEEE/CVF Conference on Computer Vision and Pattern Recognition, pp. 6908-6917 (2019).
Hold-Geoffroy, Y., et al., "Deep Sky Modeling for Single Image Outdoor Lighting Estimation", In Proceedings of the IEEE/CVF Conference on Computer Vision and Pattern Recognition, pp. 6927-6935 (2019).
Jain, A., et al., "Zero-shot text-guided object generation with dream fields", arXiv:2112.01455v1, pp. 1-12 (Dec. 2, 2021).
Karras, T., et al., "Analyzing and Improving the Image Quality of StyleGAN", In Proceedings of the IEEE/CVF Conference on Computer Vision and Pattern Recognition, pp. 8110-8119 (2020).
Nguyen-Phuoc, T., et al., "HoloGAN: Unsupervised Learning of 3D Representations From Natural Images", In Proceedings of the IEEE/CVF International Conference on Computer Vision, pp. 7588-7597 (2019).
Nichol, A., et al., "GLIDE: Towards Photorealistic Image Generation and Editing with Text-Guided Diffusion Models", arXiv:2112.10741v2, pp. 1-20 (Dec. 22, 2021).
Or-El, R., et al., "StyleSDF: High-Resolution 3D-Consistent Image and Geometry Generation", arXiv:2112.11427v1, pp. 1-17 (Dec. 21, 2021).
Patashnik, O., et al., "StyleCLIP: Text-Driven Manipulation of StyleGAN Imagery", In Proceedings of the IEEE/CVF International Conference on Computer Vision, pp. 2085-2094 (2021).
Radford, A., et al., "Learning Transferable Visual Models From Natural Language Supervision", Proceedings of the 38th International Conference on Machine Learning (PMLR 139), pp. 1-16 (2021).
Ranftl, R., et al., "Vision Transformers for Dense Prediction", In Proceedings of the IEEE/CVF International Conference on Computer Vision, pp. 12179-12188 (2021).
Riegler, G., and Koltun, V., "Free View Synthesis", In European Conference on Computer Vision, pp. 1-17 (2020).
Zhang, R., et al., "The Unreasonable Effectiveness of Deep Features as a Perceptual Metric", In Proceedings of the EEE Conference on Computer Vision and Pattern Recognition, pp. 586-595 (2018).

* cited by examiner

MULTIDIMENTIONAL IMAGE EDITING FROM AN INPUT IMAGE

BACKGROUND

Various technologies, such as computer vision and graphics-based technologies, render media (e.g., photographic images) or provide varied functionality associated with media. For example, media editing software provide tools (e.g., cut, paste, select) to users so that they can create or modify visual data of digital images and video.

SUMMARY

One or more embodiments described herein provide benefits and solve one or more problems in existing technology by changing parameters of a multidimensional (e.g., 3D) representation of an input (e.g., 2D) image based on a user request to change such parameters. Such change can occur by using a ML-based image editing model that disentangles (or breaks down features of) the input image into the attributes that are useful for 3D editing. In particular, such image editing model leverages lighting and depth estimation models to extract the lighting, shape information of content, and/or camera parameters (e.g., camera angle) of the input image. The camera and light parameters are exposed in the user interface to be edited by the user.

Some embodiments edit or change image content based on user input of natural language text descriptions. For example, if the user types "looks like French Alps in July," the image editing model will transform the scene such that the output looks more like the French Alps in the summer. The image editing model also assimilates the edited light, camera, and scene content information into a realistic photograph.

In operation, some embodiments first receive an input image (e.g., a 2D photograph) and generate, via a model (e.g., a modified Generative Adversarial Network (GAN) model), a multidimensional image that represents the input image, except it is in multiple dimensions, such as in 3D. Subsequently, particular embodiments receive, via user input at a user device, a request to change at least a first parameter of the multidimensional image to a second parameter, which is a request to edit the multidimensional image in some way. For example, the request may be to change the light source position or camera position from a first set of coordinates to a second set of coordinates.

In response to receiving such editing request, some embodiments automatically change at least the first parameter to the second parameter according to the requested change such that the multidimensional image is changed. For example, using the illustration above, in response to receiving an indication of a request to change a camera position, particular embodiments may add or otherwise change pixel values, which is indicative of adjusting the view of content in the first multidimensional image according to the new requested camera position.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Figure 1:
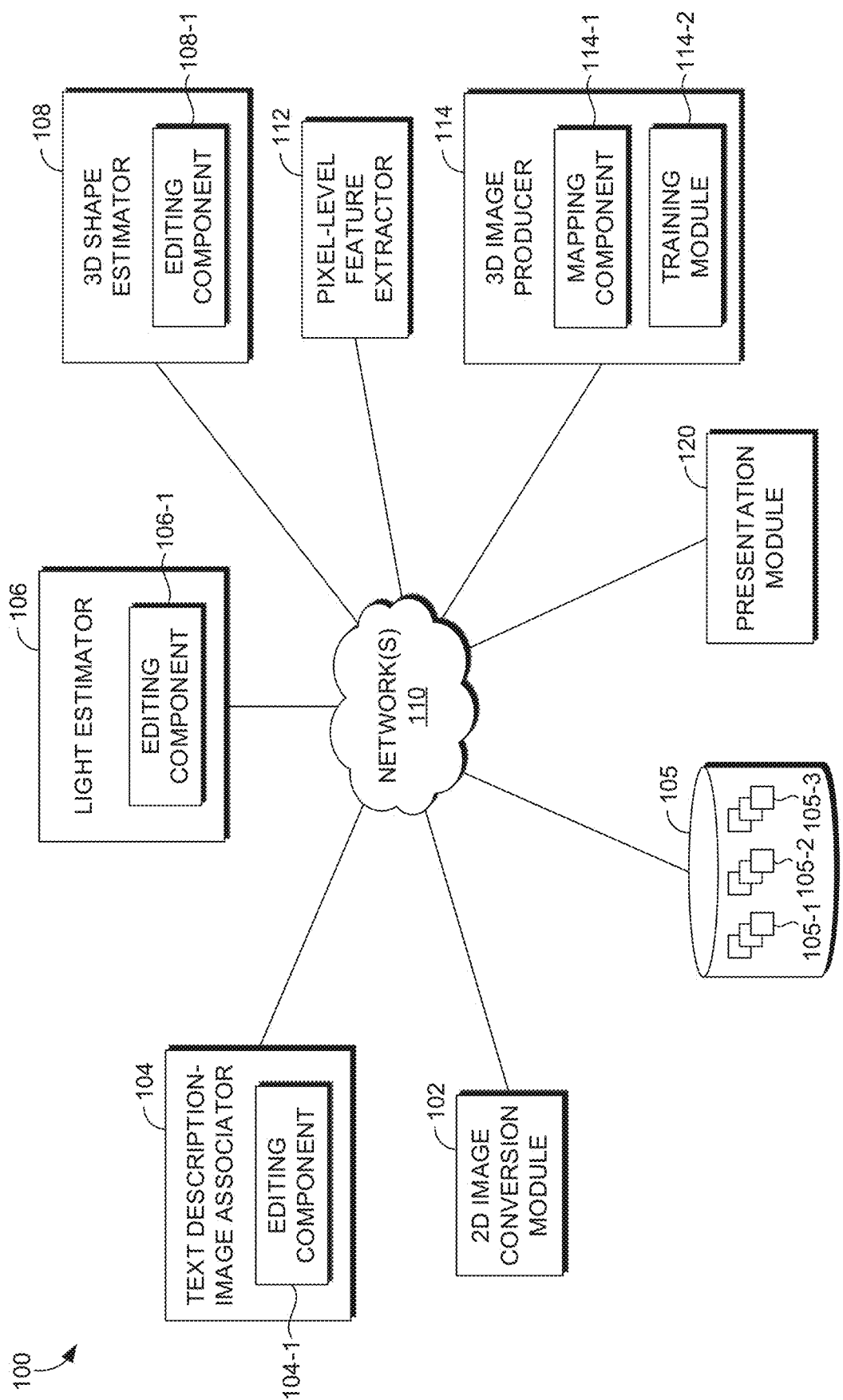
FIG. 1 is a block diagram illustrating an example computing system architecture suitable for implementing embodiments of the disclosure.

Users often take photographs or videos that capture scenes or other real-world objects, but may desire to change or enhance certain features that are not readily editable. For example, a user may have taken a single photograph of a real-world scene but wishes they would have changed the camera view angle or the lighting angle. Various technologies, such as computer vision-based technologies, are practically unable change the camera angle or certain other three-dimensional parameters of the original photograph according to a user's requested edits. Although certain computer vision technologies can perform inverse graphics functionality, they still have many technical problems. Inverse graphics is the concept of taking a 2-dimensional (2D) image (or sequence of images taken from different viewpoints) and outputting a 3-dimensional (3D) representation of the real world scenes or objects contained in such image. However, these technologies and models: lack robust and user-friendly 3D editing functionality derived from corresponding 2D images, do not employ intuitive human-computer interaction and user interface features, and unnecessarily consume computing resources (e.g., latency, network bandwidth, and input/output (I/O)), among other technical problems.

Some existing computer vision and graphics-based inverse graphics technologies do not incorporate any user edits at all. For example, although existing machine learning models can apply image effects from a 2D image to a 3D image, they are destructive. For instance, some deep learning algorithms perform image effect transfer based on manipulating the node activations of a deep learning model (e.g., iterative gradient descent of Gatys), or do so in a single forward pass (e.g., AdaIN, Cycle-GAN) without the ability to change the content according to user edits. What this means is that all the pixel manipulations indicative of various layers of an image effect are aggregated into a single layer. Accordingly, users have no control over any of the pixel manipulations of the image effect of the 3D image. For example, although particular technologies can apply a particular foreground color (a first layer) and a particular background color (a second layer) to a 3D image that represents another 2D image, users are not able to modify (e.g., cut out or add more content) either the first layer or the second layer in the 3D image.

Some existing technologies do not employ robust but yet user-friendly inverse graphics editing features, thereby negatively affecting the functionality as well as the user experience. For example, some technologies edit mesh vertices that define real world objects in images, as well as edit the accompanying texture map based on direct manual user input. But these features are too complex to use and are not intuitive. These graphics editing features do not include other useful features, such as camera angle editing features to change the angle of an image, text-based features to change a 3D image according to the user's natural language input, and features to place more or less particular content in an image.

Similarly, existing technologies also do not employ intuitive human-computer interaction and user interface features. As described above, some technologies allow users to directly edit mesh vertices and texture maps. However, such corresponding user interfaces makes editing a challenge. For example, if the user desired to change the angle that a photograph was taken at, or otherwise change the shape of an object in the photograph in 3D, the user would have to manually select the vertices that make up the object and manually drag each vertex to the desired position, which is tedious, increases the likelihood of inaccuracy, and requires extensive manual user input. Similarly, in order to edit texture, the user would have to manually draw or remove texture, which is tedious.

Existing technologies are also computationally expensive and unnecessarily consume computer resources. For example, existing inverse graphics machine learning models can load an image into a 3D representation, but does so at a high latency value and high GPU/CPU utilization. This is because these existing models require runtime image input embeddings to be compared against a myriad of training 3D embeddings to obtain the correct 3D representation, which requires multiple passes across the models for each comparison. Such iterative processing additionally taxes corresponding bandwidth resources because there is a consistent need to dedicate bits for this image processing, thereby constraining the amount of bits that can be used for other tasks during the same time interval. In another example, as described above, in order to edit an image, existing user interfaces require users to manually drag corresponding vertices or otherwise manually apply edits at the mesh level. This causes unnecessary storage device I/O (e.g., excess physical read/write head movements on non-volatile disk) because each time a user inputs manual edits (of which there are several), the computing system has to reach out to the storage device to perform a read or write operation, which is time consuming, error prone, and eventually wears on components, such as a read/write head, because of such repetitive manual editing inputs.

Various embodiments of the present disclosure provide one or more technical solutions to one or more of the technical problems described above. Particular embodiments are directed to changing parameters of a multidimensional (e.g., 3D) representation of an input (e.g., 2D) image based on a user request to change such parameters. In operation, some embodiments receive an input image (e.g., a photograph) and generate, via a model (e.g., a modified Generative Adversarial Network (GAN) model), a multidimensional image that represents the 2-dimensional image, except it is in multiple dimensions, such as in 3D.

Subsequently, particular embodiments receive, via user input at a user device, a request to change at least a first parameter of the multidimensional image to a second parameter, which is a request to edit the multidimensional image in some way. For example, the multidimensional image may be a photograph of a summer cactus scene at night and such user input may be a natural language string that reads, "make the image a winter scene during the day." Accordingly, the request may be to change a lighting parameter to brighten the pixels indicative of changing night to day and to add pixels representing snow content to the multidimensional image (but not change the cacti or other content geometries in any other way). In another example, the request may be to change a first angle as represented in the 2D image to a second angle.

In response to receiving such editing request, some embodiments change at least the first parameter to the second parameter according to the requested change such that the multidimensional image is changed to another multidimensional image. For example, using the illustration above, the multidimensional image of the summer night scene is changed such that pixel values representing night are changed to pixel values representing day and pixel values representing snow are appended to the multidimensional image, but the pixel values representing the geometry of the cacti remain the same.

Various embodiments of the present disclosure improve existing computer vision and graphics-based technologies. Specifically, for example, one improvement is the ability for users to perform multidimensional edits using input images. In other words, the technical solution is changing one or more parameters of a multidimensional image (or input image) according to a user request to change such parameters. As described above, some existing computer vision and graphics-based inverse graphics technologies do not change or incorporate any user edits at all. This is because they employ models that are destructive, as they do not change parameters according to user edits. However, various embodiments of the present disclosure employ models that are not destructive, but employ models (e.g., modified Generative Adversarial Networks (GAN)) or algorithms (e.g., generators) that change different embeddings (e.g., vectors representing different features of a photograph) that conform precisely to the user edit request. In this way, users can change certain parameters, such as adding more content (e.g., snow), changing the lighting, and/or changing the camera angle of an image. Accordingly, another technical solution is the model that some embodiments use, which changes embeddings that conform precisely to user edit requests unlike existing technologies.

Various embodiments improve existing technologies because they employ robust and user-friendly inverse graphics editing features, thereby improving the functionality as well as the user experience. For example, some embodiments employ certain editing features, such as editing features to change a lighting parameter, editing features to change a camera angle parameter, an editing feature to change the amount of particular content in an image, and/or a text-based features to change the image according to the user's natural language input. Unlike existing technologies that require directly and manually editing mesh vertices and texture maps, various embodiments provide features for easily changing the lighting, the amount of content, or the camera angle of an image (e.g., without directly interfacing with the vertices, edges, or content in an image). Accordingly, the light changing feature, camera angle change feature, the amount of content feature, and the text-based features are individually or in combination a technical solution.

Similarly, particular embodiments improve human-computer interaction and user interface features, relative to existing technologies. As described above, some technologies allow users to directly edit mesh vertices and texture maps. However, instead of the user having to manually select the vertices that make up the object and manually drag each vertex to the desired position, particular embodiments incorporate a text-based feature (e.g., a text field) at a user interface, which allows a user to describe, in natural language characters, the scene they want instead of creating the scene they want. In other words, particular content of a multidimensional image can be automatically generated based on natural language character inputs, as opposed to the user having to manually create such image via vertex changes (which is more tedious relative to automatically generating the content). Other user interface features include a light changing slider or other UI element, a camera angle change UI element, and the amount of content UI element presented at the user interface. For example, instead of the user having to manually change multiple vertices of multiple objects to change an angle of an entire scene, the user would simply drag or otherwise select a user interface element, which automatically changes the entire angle of the multidimensional image, which is less tedious and more intelligent with respect to human-computer interaction. Accordingly, other technical solutions include one or more user interface elements that are user-selectable or can receive natural language characters, which change light parameters, camera angle parameters, and/or amount of content parameters.

Particular embodiments also improve computer resource consumption. For example, particular embodiments map an image into a multidimensional representation in a single forward pass, which decreases latency and lowers GPU/CPU utilization. This is because particular embodiments use specific modified GANs at runtime, which only needs generators to generate multidimensional images, since the model has already been trained via specialized discriminators (which are not used at runtime). In other words, unlike existing technologies, particular embodiments do not require runtime image input embeddings to be compared against a myriad of training 3D embeddings to obtain the correct 3D representation. Rather, particular generator component embodiments can generate a multidimensional image from a 2D image in a single pass. Consequently, bandwidth resources are also saved because there is no need (or less need) to dedicate bits for this image processing, thereby freeing the amount of bits that can be used for other tasks during the same time interval.

Particular embodiments also improve storage device I/O. As described above, in order to edit an image, existing user interfaces require users to repetitively and manually drag corresponding vertices or otherwise manually apply edits at the mesh level. This causes unnecessary storage device I/O. However, particular embodiments automatically apply edits (e.g., automatically change the camera angle of an entire scene) based on particular new rules (e.g., natural language character conditions set by the user), which means that the computing system has to reach out to the storage device to perform a read or write operation fewer times, which is less time consuming, less error prone, and wears less on components, such as a read/write head. Take for example, a user who inputs a natural language character sequence that says, "make a July night scene," where the existing image is a winter day scene. Instead of embodiments receiving a first manual user input to change the winter effect to a summer effect (a first I/O) and a second manual user input to change the day into night (a second I/O), particular embodiments can make both changes in a single I/O based on processing the natural language character request. Accordingly, one technical solution is the modified GAN model, as well as the use of the text-based editing feature.

Referring now to FIG. 1, a block diagram is provided showing high-level aspects of an example computing system architecture suitable for implementing embodiments of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system 100 may be located within a single computing device (e.g., the computing device 900 of FIG. 9). Alternatively, some or each of the components may be distributed among various computing devices, such as in a distributed cloud computing environment. In some embodiments, the system 100 and each of the components are located within the server and/or user device of FIG. 8, as described in more detail herein.

The system 100 is generally responsible for producing and presenting edited multidimensional images that were originally derived from 2D images, according to some embodiments. The system 100 includes a 2D image conversion module 102, a text description-image associator 104, a light estimator 106, a 3D shape estimator 108, a pixel-level feature extractor 112, a 3D image producer 114, and a presentation module 120, each of which are communicatively coupled via one or more networks 110 and the storage 105. The network(s) 110 can be any suitable network(s), such as a Local Area Network (LAN), a Wide Area Network (WAN), the internet, or a combination of these, and/or include wired, wireless, or fiber optic connections. In general, network(s) 110 can represent any combination of connections (e.g., APIs or linkers) or protocols that will support communications between the components of the system 200. The components of the system 100 may be embodied as a set of compiled computer instructions or functions, program modules, computer software services, logic gates, or an arrangement of processes carried out on one or more computer systems.

The 2D image conversion module 102 is generally responsible for converting a 2D image (e.g., one of the runtime images 105-3) into a set of vectors that represent the 2D image. For example, each pixel color value of the 2D image is converted to a numerical value that represents the pixel color value. In some embodiments, such numerical value ranges from 0 to 1. In some embodiments, one or more machine learning models or pre-processing components are responsible for such conversion. For example, a Convolutional Neural Network (CNN) can receive an encoded jpeg image and decode the image into a 3-channel representation—a 3-dimensional matrix (or list, array, or tensor) where each dimension represents a color channel: R, G, and B (Red, Green, Blue), and where each matrix is composed of numbers representing pixel intensity.

The text description-image associator 104 is generally responsible for associating natural language characters that a user has input to one or more corresponding features or set of pixels in an image. In other words, the text description-image associator 104 maps natural language words or other natural language character sequences (e.g., sentences, paragraphs, symbols) to their real-world or image counter parts in an image. For example, a user may input the phrase, "change the car to a Ford F-150." The text description-image associator 104 may then map the words "Ford F-150" to the car indicated in the image. In order to do this functionality, particular embodiments use one or more models, such as Contrastive Language-Image Pre-Training (CLIP) models (which is described in more detail below), natural language processing (NLP) models (e.g., BERT), and/or one or more object detection models (e.g., CNN).

NLP is the concept of machines understanding natural language via components such as tokenizing (e.g., parsing each word in a sentence), Part-of-Speech (POS) tagging (determining the part of speech of a particular tokenized word or piece of text based on its use and context and tagging the word with a POS identifier), Word sense disambiguation (the selection of the meaning of a word with multiple meanings through a process of semantic analysis that determine the word that makes the most sense in the given context), Named entity recognition (NER) (maps words or phrases to corresponding entities, such as "Kentucky" is a "location"). Such functionality can be used to understand what the user is requesting for an edit to a multidimensional image.

Some embodiments use computer vision, object detection, and/or image classification techniques (e.g., Convolutional Neural Networks) in order to locate corresponding features or objects specified in natural language. In an illustrative example of object detection functionality, particular embodiments use one or more machine learning models (e.g., a Convolutional Neural Network (CNN)) to generate a bounding box that defines the boundaries and encompasses a computer object representing a feature (e.g., a car.) of an image. These machine learning models can also generate a classification prediction that the computer object is a particular feature. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in documents. In an illustrative example, in an image, a first bounding box can be generated over a set of pixels representing a car.

In some embodiments, one or more machine learning models can be used and trained to generate tighter bounding boxes for each object. In this way, bounding boxes can change in shape and confidence levels for classification/prediction and can be increased based on increased training sessions. For example, the output of a CNN or any other machine learning model described herein can be one or more bounding boxes over each feature of an image (corresponding to a feature in an image), where each bounding box includes the classification prediction (e.g., this object is a building) and the confidence level (e.g., 90% probability).

The editing component 104-1 is generally responsible for changing or editing a multidimensional image according the natural language characters the user inputs. For example, a CLIP model (described in more detail below) can change a vector embedding, which indicates a change in day to night in an image. Accordingly, particular embodiments change the mappings, embeddings, pixel values, and the like to indicate the requested change, as described in more detail below.

The light estimator 106 is generally responsible for estimating (via a score) one or more light parameters of a 2D image (e.g., one of the runtime images 105-3). The lighting conditions of outdoor scenes can create significant differences in the scene appearance depending on the weather and the time of day. Consider, for example, the striking contrast created by bright highlights and dark shadows at noon, or the gray ominous look of overcast conditions. This wide variety of effects is challenging for approaches that attempt to estimate the lighting conditions from outdoor images.

In some embodiments, the estimating of the light estimator 106 includes estimating the direction of the light source, the lighting strength/intensity, and/or the lighting color of an input image. In some embodiments, such estimation is performed via one or more models (described in more detail below). In some embodiments, such estimation is additionally or alternatively done via one or more linear aggregation or other numerical-based techniques. For example, in order to estimate lighting intensity, the light estimator 106 may perform a computer read of the matrix that includes a vector of numbers that represent the pixel color values (described with respect to the 2D image conversion module 102), and compute the average numerical value with respect to each value (corresponding to each pixel).

The editing component 106-1 is generally responsible for changing or editing one or more lighting parameters of an input 2D image and/or a multidimensional image according to a user input request. For example, particular embodiments may receive an indication that a user is dragging a light source indicator (e.g., which represents the sun) from a first position to a second position, which causes pixels to change values that reflect the changed shadows and lighted surfaces according to the position of the light source indicator. Accordingly, particular embodiments change the mappings, embeddings, pixel values, and the like to indicate the requested change, as described in more detail below.

The 3D shape estimator 108 is generally responsible for estimating (via a score) a multidimensional shape of one or more features/objects indicated in a 2D image. For example, given a 2D image of a shipping parcel (currently represented as a 2D square), the 3D shape estimator 108 can predict that the square corresponds to a cube shape and accordingly add line segments and surfaces indicative of a cube shape of the shipping parcel. In some embodiments, such prediction occurs via one or more models, which is described in more detail below.

The editing component 108-1 is generally responsible for changing or editing one or more camera angle parameters of a multidimensional image and/or a 2D image according to a user input request. In some embodiments, such request changes the multidimensional shape predicted by the 3D shape estimator 108. For example, using the illustration above, particular embodiments may receive an indication that a user is dragging an indicator (e.g., which represents a camera) from a first position to a second position, which means that the multidimensional parcel will change orientations (e.g., the rear face, which was previously not visible is now visible). Accordingly, particular embodiments change the mappings, embeddings, pixel values, and the like to indicate the requested change, as described in more detail below.

The pixel-level feature extractor 112 is generally responsible for extracting pixel-level values or details from a 2D image. For example, the pixel-level feature extractor 112 may capture surface texture of a wall, blades of grass, specific tree leaves, wrinkles on a face, or any other specific granular details of specific objects, foregrounds, or backgrounds of an image. In other words, the pixel-level feature extractor 112 learns to capture any remaining information that the 3D shape estimator 108 does not capture in order to fully reconstruct an input image, which is described in more detail below. In some embodiments, the pixel-level feature extractor 112 also includes an editing component (not shown), which is responsible for receiving an indication that a user has requested to change or edit one or more pixel-level details, such as amount of content present in an image (e.g., an amount of snow on the ground, the amount of vegetation, etc.). Accordingly, particular embodiments change the mappings, embeddings, pixel values, and the like to indicate the requested change, as described in more detail below.

The 3D image producer 114 is generally responsible for mapping various vectors or vector embeddings received from the 2D image conversion module 102 (representing the 2D image), text description-image associator 104, the light estimator 106, the 3D shape estimator 108, and/or the pixel-level feature extractor 112 into multidimensional space in order generate the multidimensional representation/image of the 2D image. In some embodiments, the 3D image producer 114 produces the multidimensional image by converting the 2D image to a multidimensional representation without any edits. In some embodiments, the 3D image producer 114 additionally produces changed multidimensional images by executing user requests according to the editing components 104-1, 106-1, 108-1, and/or for the pixel-level feature extractor 112.

The 3D image producer 114 includes a mapping component 114-1 and a training component 114-2. The mapping component 114-1 is generally responsible for mapping a set of vectors into multidimensional space, where the multidimensional space corresponds to or represents a particular representation of the 2D image in multiple dimensions. In some embodiments, the multidimensional space includes or is indicative of one or more data objects 105-2 (e.g., a matrix) that orients vectors in multiple dimensions, where each dimension corresponds to a particular parameter, such as text descriptions via the text description-image associator 104 (a first dimension), a set of light parameters estimated by the light estimator 106 (a second set of dimensions), a 3D shape of one or more objects as estimated by the 3D shape estimator 108 (a third set of dimensions), and a pixel-level features extracted via the pixel-level feature extractor 112 (a fourth set of dimensions).

In some embodiments, the mapping of the mapping component 114-1 additionally or alternatively includes mapping vectors in Cartesian space (representing the 2D image) to projective coordinate space (the multidimensional space). In an illustrative example, some embodiments use transformation matrices to modify and reposition points from one frame to another. A transformation matrix can be decomposed into 4 sub-matrices, all playing a role in the transformation of coordinates in space—a translation matrix, a rotation matrix, a scaling matrix and a shearing (or Skewing) matrix. Translation matrices stores values indicating translations (movement of objects without deformation) on different axes (e.g., X, Y, and Z). The rotation matrix can be broken down into the product of rotation matrices on the different axes (the changing of the angle of an object which can be clockwise or anticlockwise). Scale matrix allows to imitate the zoom level or size of corresponding objects. The shearing matrix makes it possible to stretch (to shear) on the different axes.

Some embodiments additionally use homogenous coordinates to transition from a Cartesian coordinate system (corresponding to the 2D image) to a projective coordinate system (corresponding to a 3D image). Some embodiments apply these transformation matrices by considering angles in degrees (0° to 360°) and measurements in pixels.

Projective coordinates is a system of coordinates used in projective geometry, as Cartesian coordinates used in Euclidean geometry. It is a coordinate system that algebraically treats all points in the projective plane (both Euclidean and ideal) equally. For example, there may be a point in the Cartesian coordinates (x, y). To represent this same point in the projective coordinates, particular embodiments add a third coordinate of 1 at the end—(x,y, 1). If the homogeneous coordinates of a point are multiplied by a non-zero scalar then the resulting coordinates represent the same point. Projective coordinates allow for an easy combination of multiple transformations by concatenating several matrix-vector multiplications—e.g., concatenating thee translation matrix, a rotation matrix, a scaling matrix and a shearing (or skewing) matrix described above.

Alternatively or additionally, in some embodiments, the multidimensional space refers to a modeling of a multidimensional (3D) image that will appear in the final output multidimensional image. For example, the multidimensional space can include a multidimensional image with vertices, edges, and polygons, which together make up a tetrahedral mesh that forms objects within the multidimensional image. The mesh skeleton contains volume and depth information that the computer can process, making it into a 3D model.

In some embodiments, the functionality of mapping component 114-1 additionally or alternatively includes mapping one or more homographies between an input 2D image and an output 3D image. A "homography" refers to a transformation data element or structure (e.g., a 3×3 matrix) that maps points in one image (e.g., i.e., an input 2D image) to corresponding points in another image (e.g., an output multidimensional image). For example, a first set of pixels representing a first 2D edge of a book in a 2D image can be mapped to a second set of pixels representing the same first edge of the book, except that the first edge is represented in 3 dimensions. In this way, pixels in different images representing the same object can be identified and rendered in different images. Such homography mapping can be performed as follows:

$$H = \begin{bmatrix} h_{00} & h_{01} & h_{02} \\ h_{10} & h_{11} & h_{12} \\ h_{20} & h_{21} & h_{22} \end{bmatrix}$$

For a first set of corresponding points $(X_1, Y_1)$, in a 2D image, and $(X_2, Y_2)$, in an output multidimensional image, then homography H, in particular embodiments, maps the corresponding points in the following way:

$$\begin{bmatrix} x_1 \\ y_1 \\ 1 \end{bmatrix} = H \begin{bmatrix} x_2 \\ y_2 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_2 \\ y_2 \\ 1 \end{bmatrix}$$

In some embodiments, in order to generate this mapping, machine learning models, such as a first deep learning model (e.g., an OANet CNN) can be used. Certain CNNs can efficiently establish the correspondences between objects in a 2D input image and objects in a 3D image. It is understood that homographies are representative only, and that alternative functionality or data may be determined to map or match features between input and output images. For example, instead of defining projective space through homographies, the projective space can be defined through a set of axioms, lines (e.g., line segments), collineations (e.g., projective collineations), or other data elements, which do not explicitly involve any field (e.g., synthetic geometry).

The training component 114-2 is generally responsible for training one or more machine learning models so that the 3D image producer 114 can produce the correct multidimensional image. The training component 114-2 uses a set of training images 105-1 in order to learn how to generate multidimensional images resembling the training images 105-1 (2D images) and accurately generate images that indicate user edits based on acceptable losses according to loss functions, which is described in more detail below.

In some embodiments, the 3D image producer 114 uses or represents a Generative Adversarial Network (GAN), or component thereof, such as a generator, which is described in more detail. However, additionally or alternatively, in some embodiments, the 3D image producer 114 (or any other functionality described herein, such as the 2D image conversion module 102, the text description-image associator 104, the light estimator 106, the 3D shape estimator 108, and/or the pixel-level feature extractor 112) uses or represents any other suitable model according to any techniques.

In an illustrative example, any model described herein can include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative di chotomi ser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning or model algorithm.

The presentation module 120 is generally responsible for presenting content (or causing presentation of content) and related information to a user, such slider UI features, 2D images, and/or multidimensional images. Presentation module 120 may comprise one or more applications or services on a user device, across multiple user devices, or in the cloud. For example, in one embodiment, presentation module 120 manages the presentation of content to a user across multiple user devices associated with that user. Based on content logic, device features, and/or other user data, presentation module 120 may determine on which user device(s) content is presented, as well as the context of the presentation, such as how (or in what format and how much content, which can be dependent on the user device or context) it is presented, when it is presented, etc. In particular, in some embodiments, presentation module 120 applies content logic to device features, or sensed user data to determine aspects of content presentation.

In some embodiments, presentation module 120 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation module 120 can cause presentation of a visual rendering that reflects an output multidimensional image. The presentation module 120 can additionally or alternatively cause presentation of other contextual data or metadata, such as timestamps of when a 2D image was uploaded, source images, UI elements for users to manipulate visual renderings, and the like.

The storage 105 (e.g., a database, RAM, cache, persistent storage, RAID, etc.) includes different training images 105-1 (e.g., different 2D images) that have been used to train deep networks or other machine learning models, as described in more detail below. Additionally or alternatively, storage 105 includes mapping objects (e.g., matrices 105-2) representing multidimensional space, as well as runtime images 105-3 (e.g., a particular 2D image that a user is currently or has uploaded during a first computer session).

Figure 2:
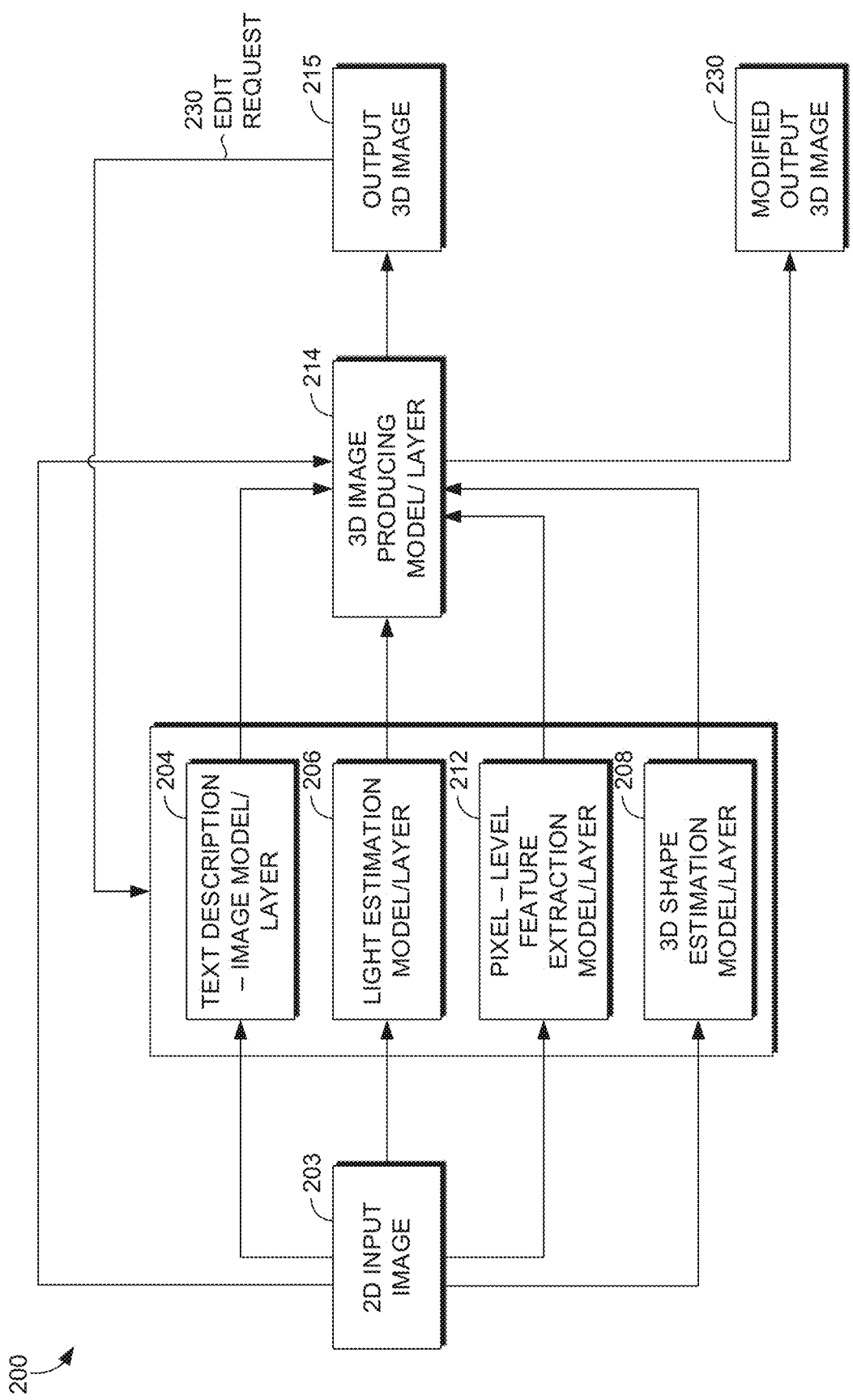
FIG. 2 is a block diagram of an example system illustrating the inputs and outputs of one or more models, or layers of a single model, that are utilized to produce an output 3D image from a 2D image, according to some embodiments.

FIG. 2 is a block diagram of an example system 200 illustrating the inputs and outputs of one or more models, or layers of a single model, that are utilized to produce an output 3D image 215 from a 2D image 203, according to some embodiments. In some embodiments, the 2D image represents one of the training images 105-1 or runtime images 105-3 of FIG. 1. In some embodiments, the text description-image model/layer 204 represents the text description-image associator 104 of FIG. 1 such that it includes identical functionality. In some embodiments, the light estimation model/layer 206 represents the light estimator 106-1 of FIG. 1 such that it includes identical functionality. In some embodiments, the pixel-level feature extraction model/layer 212 represents the pixel-level feature extractor 112 of FIG. 1 such that it includes identical functionality. In some embodiments, the 3D shape estimation model/layer 208 represents the 3D shape estimator 108 of FIG. 1 such that it includes identical functionality. In some embodiments, the 3D image producing model/layer 214 represents the 3D image producer 114 of FIG. 1 such that it includes identical functionality.

In some embodiments, FIG. 2 illustrates 2 stages—an encoding stage and a user edit stage. The encoding stage is indicative of the 2D input image 203 being automatically translated or converted into the output 3D image 215 (without the edit request(s) 230). Accordingly, the encoding stage can include automatically: decoding or disentangling, via the text description-image model/layer 204, vector embeddings that represent natural language descriptions of the 2D image 203 and encoding the predicted vector embeddings into a data object, decoding or disentangling, via the light estimation model/layer 206, vector embeddings that represent one or more lighting parameters of the 2D image 203 and encoding the predicted vector embedding into the data object (or another data object), decoding or disentangling, via the pixel-level feature extraction model/layer 212, vector embeddings that represent one or more pixel-level parameters of the 2D image 203 and encoding the predicted vector embedding into the data object (or another data object), and/or decoding or disentangling, via the 3D shape estimation model/layer 208, vectors embeddings that represent or 2D shapes for one or more objects located in the 2D image 203 and encoding the predicted 3D shapes for the corresponding one or more objects.

The 3D image producing model/layer 214 takes, as input, the 2D input image 203 (or set of vectors representing the 2D image) and each of the vector embeddings or corresponding data objects (derived from 204, 206, 212, and 208), concatenates each of the vector embeddings or data objects and projects the concatenated results into multidimensional space. For example, the 3D image producing model/layer 214 projects Cartesian space vectors representing: a natural language description of the entire 2D input image 203, light parameters (e.g., intensity, light angle) of the 2D input image 203, textures on objects within the 2D input image 203, and 3D shape estimations into projective coordinate space. The 3D image producing model/layer 214 subsequently, as still part of the encoding stage, takes as input, the projective coordinate space in order to produce the output 3D image 215. In some embodiments, during the encoding stage, the 3D image producing model/layer 214 includes a generator from a modified GAN in order to produce 3D images that closely match parameter values of the 2D input image 203, as described in more detail below.

In some embodiments, during the encoding stage, the text description—image model/layer 204 processes the 2D input image 203 (or vectors representing the 2D input image 203) through a first classifier model. Such classifier model can be or include any suitable model. For example, the model may be or include decision tree classifiers, rule-based classifiers, neural networks (e.g., Convolutional Neural Network (CNN)), WORD2VEC model, support vector machines, BERT, and/or naïve Bayes classifiers. The output includes a computer-generated natural language caption that describes the images, such as "a screenshot of a cell phone," which is an example of a natural language text description.

At the editing stage, particular embodiments receive an indication of the edit request 230, which is a user request to edit one or more parameters of the resulting output 3D image 315 in order to generate the modified output 3D image. For example, some embodiments receive an indication that the user has moved a slider UI element indicative of changing light intensity from value A to value B. Responsively, the light estimation model/layer 206 changes its corresponding vector embeddings to represent value B and therefore the multidimensional space such that the 3D image producing model/layer 214 generates the modified output 3D image 230. With respect to this example, the modified output 3D image 230 is the same as the output 3D image 215, except that the lighting intensity is different (e.g., pixel values representing night are brightened to pixel values representing day time).

In some embodiments, during the editing stage, the 3D image producing model/layer 214 includes a generator from a modified GAN in order to produce 3D images that closely match the edit request 230, as described in more detail below.

Figure 3:
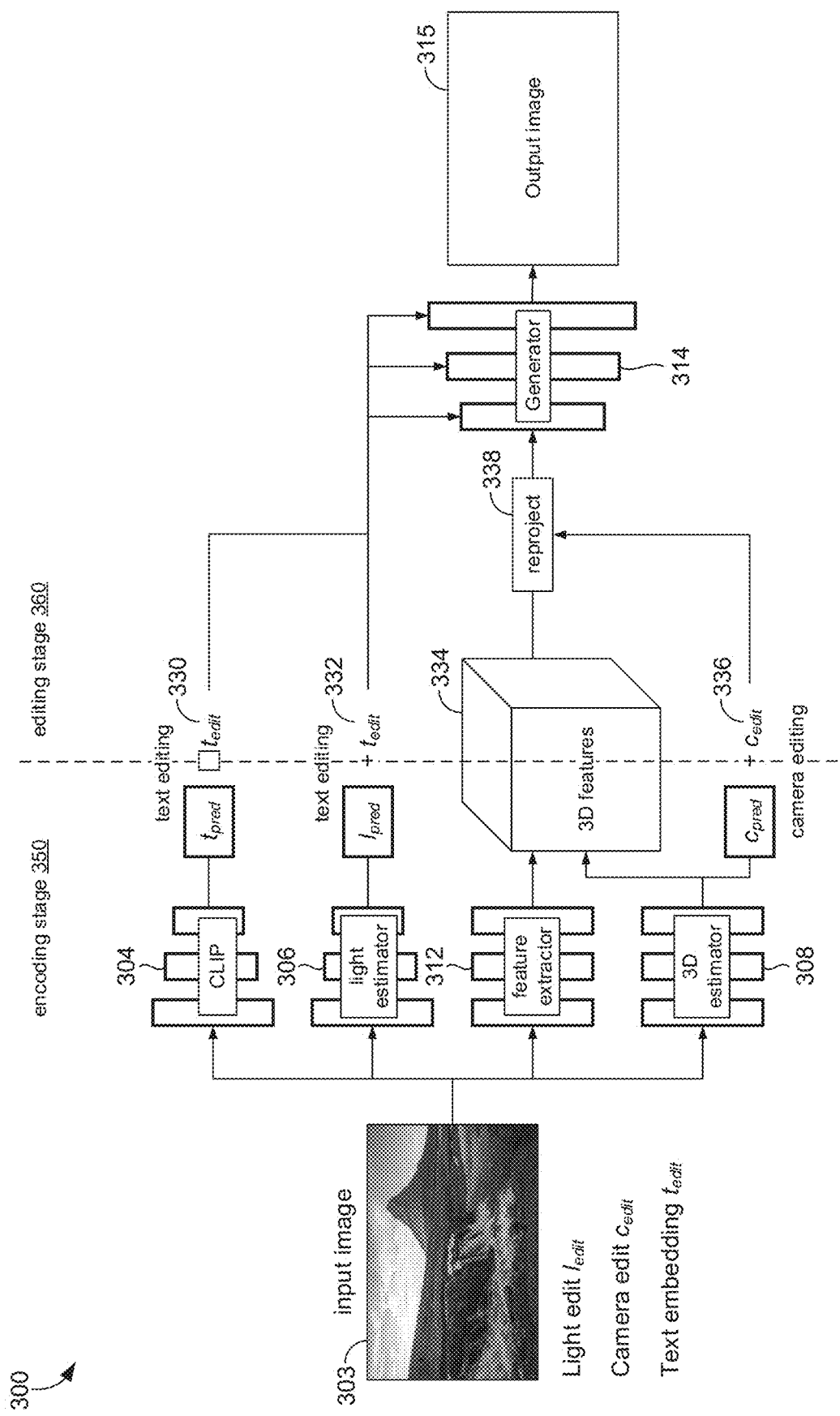
FIG. 3 is a schematic diagram illustrating two-stage generation of an output image from the input image, according to some embodiments.

FIG. 3 is a schematic diagram illustrating two-stage generation of an output image 315 from the input image 303, according to some embodiments. Currently there exists no practical technology that can achieve disentangled 3D editing from 2D images on general scenes. Inverse graphics has been a very challenging problem that is intimately contingent on the fundamental problems of computer vision. FIG. 3 illustrates an overall pipeline that enables 3D editing of 2D photos via camera, light, and text edits.

The model 300 includes the input image 303, the CLIP model 304, the light estimator 306, the feature extractor 312, the 3D estimator 308, the text editing edits 330, the light editing edits 332, the 3D features 334, the camera editing edits 336, the reprojection component 338, the generator 314, and the output image 315. In some embodiments: the input image 303 represents the 2D input image 203 of FIG. 2, the CLIP model 304 represents and includes the functionality of the text description-image associator 104-1 of FIG. 1 or the text description—image model/layer 204 of FIG. 2, the light estimator 306 represents and includes the functionality of the light estimator 106 of FIG. 1 or the light estimation model/layer 206 of FIG. 2, the feature extractor 312 represents or includes the functionality of the pixel-level feature extractor 112 of FIG. 1 or the pixel-level feature extraction model/layer 212 of FIG. 2, the 3D estimator 308 represents or includes the functionality of the 3D shape estimator 108 of FIG. 1 or the 3D shape estimation model/layer 208 of FIG. 2, the reprojection component 338 represents or includes the mapping component 114-1 of FIG. 1, the generator 314 represents or includes the functionality of the 3D image producer 114 and/or the 3D image producing model/layer 214 of FIG. 2, and/or the output image 315 represents the output 3D image 215 (or 230) of FIG. 2.

The model 300 processes the input image 303 in two stages—denoted by the encoding stage 350 and the editing stage 360. In some embodiments, at the encoding stage 350, particular embodiments use perception models (304, 306, and 308) to extract the text-compatible embedding (from 304), lighting embeddings (from 306), camera embeddings (from 308), and the 3D shape embeddings (also from 308) of the input image 303 (or vectors representing the input image 303). Additionally, some embodiments also instantiate a feature extractor 312 that learns to capture any remaining information to fully reconstruct the input image 303, such as the appearance of the textures existing in the input image 303.

After this encoding stage 350, particular embodiments attain enough information to "load" the input image 203 in a user interface (UI). Next, at the editing stage 360, the user edits 330, 332, 334, and 336 are combined to the extracted attributes or embeddings. In some embodiments, in the case of text embeddings and light parameters, the edits are added to the estimated parameters. In case of camera parameter (e.g., editing the camera angle), some embodiments re-render the features of the new viewpoint via reprojection by the reprojection component 314. For example, when some embodiments use a depth prediction model as the 3D estimator 308, the reprojection component 338 splats the features on to the xyz coordinates defined by the depth map, and reprojects the features in the image coordinates of the new camera angle pose. Finally, the edited attributes and features are passed to a trained generator network 314 to produce the output image 315.

In some embodiments, the CLIP model 304 is a neural network trained on a variety of (image, text) pairs. In some embodiments, the CLIP model 304 is instructed in natural language to predict the most relevant text snippet, given an image, without directly optimizing for the task, similarly to the zero-shot capabilities of GPT-2 and 3. For example, for various 2D images, CLIP may use object detection to detect multiple objects in the 2D images and predict which natural language text snippets describe the features. Alternatively, in some embodiments, the CLIP model 304 predicts the most relevant image feature (e.g., the lighting, amount of snowfall, camera angle) given a text snippet. The CLIP model 304 includes NLP and computer vision functionality (e.g., object detection). The CLIP model 304 specifically includes submodels, which are encoders—a text encoder and an image encoder (not shown). Each set of natural language text is encoded, via the text encoder, into a text embedding and the output is a set of vectors or numbers representing the natural language text. Each image is also encoded, via an image encoder, into an image embedding and the output is also a set of vectors or numbers representing the image.

The goal of the CLIP model 304 is that the vectors representing the natural language text be very close (e.g., via Cosine similarity) to the vectors for the corresponding image, which represents minimal loss at training. Accordingly, particular embodiments measure or determine how close the embedded representation (series of numbers) for each text is to the embedded representation for each image. In some embodiments, during pre-training, the text encoder and image encoder get fit at the same time by simultaneously maximizing the cosine similarity of matches and minimizing the cosine similarity of non-matches, across all text-image pairs. Once the model is fit, the image is passed into the image encoder to retrieve the text description that best fits the image—or, vice versa, particular embodiments can pass a text description into the model to retrieve an image.

In some embodiments, the light estimator 306 is a lighting estimation model. For example, in some embodiments, in order to estimate light in outdoor scenes, some embodiments use outdoor scene models, such as a sky model, which learn a high dynamic range (HDR) sky model directly from data. Specifically, some embodiments learn to estimate a non-parametric lighting model from a single photograph in a three-step approach. First, particular embodiments train a deep sky autoencoder that learns a data-driven, deep HDR sky model. To train this sky autoencoder, some embodiments rely on a Laval HDR sky database, which a large dataset of unsaturated HDR hemispherical sky images. In some embodiments, such training includes the following steps. First, two versions of the panorama/image are fed through the network, one after the other: the original P and a second one to which we applied random radiometric distortions $P_d$. These random distortions contain variations in exposure, white balance and camera response function·Denoting enc(·) as the encoder, the first loss used to train the sky autoencoder enforces both the undistorted z=enc(P) and distorted $z_d$=enc($P_d$) to be as close as possible by minimizing the L1 norm between them:

$$\mathcal{L}_d = \|z_d - z\|_1.$$

This loss encourages the sky encoder to be robust to radiometric distortions that may be present in the input panoramas. In some embodiments, the second loss is the typical autoencoder reconstruction loss, with the difference that both the undistorted and distorted inputs must reconstruct the original panorama using an L1 loss:

$$\mathcal{L}_r = \|\hat{P} - P\|_1 + \|\hat{P}_d - P\|_1,$$

Where $\hat{P}$=dec($\hat{z}$) and $\hat{P}_d$=dec($z_d$) are the panoramas reconstructed by the decoder dec(·). In some embodiments, the reconstruction loss $\mathcal{L}_r$ is only computed on sky pixels in the original panorama P. For example, this loss is not active for regions masked by buildings in panoramas from SUN360-HDR, as no ground truth sky appearance is known for this region. In some embodiments, the autoencoder is never penalized for any output in these regions. On the Laval HDR sky panoramas, this loss is active everywhere, even for randomly masked (black) regions. In some embodiments, the target appearance for those regions is the original sky pixels of the panorama before the sky was masked, effectively asking the autoencoder to extrapolate—or fill—the region with plausible sky appearance. In some embodiments, the sky autoencoder is trained with:

$$\mathcal{L}_s = \mathcal{L}_r + \lambda_d \mathcal{L}_d,$$

where embodiments empirically set $\lambda_d$=100 in order to balance the gradient magnitude between $\mathcal{L}_r$ and $\mathcal{L}_d$ during training. While LDR content such as clouds is lost, the reconstructed panoramas $\hat{P}$ properly model the energy distribution of the sky and are thus able to faithfully reproduce shadow characteristics like contrast and sharpness. In contrast, while the Hošek-Wilkie sky model properly approximates clear skies, it does not generalize to non-clear skies.

Second, some embodiments project the SUN360 LDR outdoor panorama dataset to HDR, using the "LDR2HDR" network. Subsequently, particular embodiments map each panorama to the latent space of HDR skies from the sky autoencoder. This effectively provides non-parametric sky labels for each panorama. Third, some embodiments train an image encoder that learns to estimate these labels from a crop. In some embodiments, such training of the image encoder includes the following steps. To estimate the sky parameters z from a limited field of view image, particular embodiments use a pretrained DenseNet-161 architecture where the last layer was replaced by a fully connected layer of 64 outputs. Some embodiments fine-tune this image-to-sky model on sky parameters z using an L2 loss:

$$\mathcal{L}_z = \|\hat{z} - z\|_2.$$

Particular embodiments add an L1 loss on the sky panoramas reconstructed from $\hat{z}$ and z by the SkyNet decoder:

$$\mathcal{L}_c = \|(dec(\hat{z})) - (dec(z)) \odot d\Omega\|_1,$$

where dec(·) denotes the SkyNet decoder, dΩ the matrix of solid angles spanned by each pixel in the sky panorama, and ⊙ the element-wise multiplication operator. In some embodiments, the image-to-sky encoder is trained by summing those two losses: $\mathcal{L}_i = \mathcal{L}_z + \lambda_c \mathcal{L}_c$. Due to the large difference in magnitude between $\mathcal{L}_z$ and $\mathcal{L}_c$, particular embodiments empirically set $\lambda_c = 3 \times 10^{-10}$ to prevent gradient imbalance during training.

Some embodiments alternatively or additionally learn to estimate lighting and reflectance from an object of known geometry, by first estimating its reflectance map (i.e., its "orientation-dependent" appearance) and subsequently factoring it into lighting and material properties. For example, some embodiments estimate a real word object surface's Spatially-varying Bidirectional Reflectance Distribution Function (SVBRDF). A Bidirectional Distribution Function (BRDF) is a function used to describe the reflectance properties of a real world object surface (or how light interacts with a surface). "Spatially-varying" BRDF means that reflectance properties change across a surface, where two points on the same surface may have different reflectance properties, which affects the light reflection (e.g., intensity, absorption, or scattering), the perceived color of the object, the relief of the object, or other microscale geometric features of the object (e.g., roughness, glossiness, etc.).

Some embodiments additionally or alternatively use deep learning models for indoor scenes that estimates spatially-varying lighting—represented as spherical harmonics (SH)—from a single image in real-time. These embodiments, take as input, a single image and a 2D location in that image, and outputs the 5th-order SH coefficients for the lighting at that location. Spherical harmonics are a low-dimensional lighting representation (36 values for 5th-degree SH for each color channel), and can be predicted with a compact decoder architecture. These local SH estimates directly embed local light visibility without the need for explicit geometry estimates. This method therefore adapts to local occlusions and reflections without having to conduct an explicit reasoning on scene geometry.

Continuing with the light estimator 306, In order to estimate light, some embodiments additionally or alternatively use Detailed Expression Capture and Animation (DECA) models on faces indicated in an image. DECA models learn an animatable displacement model from in the wild images without 2D-to-3D supervision. In contrast to prior work, these animatable expression-dependent wrinkles are specific to an individual and are regressed from a single image. Specifically, DECA jointly learns 1) a geometric detail model that generates a UV displacement map from a low-dimensional representation that consists of subject-specific detail parameters and expression parameters, and 2) a regressor that predicts subject-specific detail, albedo, shape, expression, pose, and lighting parameters from an image.

To gain control over expression-dependent wrinkles of the reconstructed face, while preserving person-specific details (e.g., moles, pores, eyebrows, and expression-independent wrinkles), the person's specific details and expression-dependent wrinkles are disentangled. Particular embodiments utilize a detail consistency loss that enforces this disentanglement. During training, given two images of the same person with different expressions, their 3D face shape and their person-specific details are the same in both images, but the expression and the intensity of the wrinkles differ with expression. Particular embodiments exploit this observation during training by swapping the detail codes between different images of the same identity and enforcing the newly rendered results to look similar to the original input images. Once trained, DECA reconstructs a detailed 3D face from a single image in real time, and is able to animate the reconstruction with realistic adaptive expression wrinkles.

In some embodiments, the feature extractor 312 and/or the 3D estimator 308 uses a depth estimation model, such as a transformer-based monocular depth estimation model (e.g., a Dense Prediction Transformer (DPT)). DPT is a dense prediction architecture that is based on an encoder-decoder design that leverages a transformer as the basic computational building block of the encoder. Specifically, particular embodiments use a vision transformer (ViT) as a backbone architecture. Particular embodiments reassemble the bag-of-words representation that is provided by ViT into image-like feature representations at various resolutions and progressively combine the feature representations into the final dense prediction using a convolutional decoder. Unlike fully-convolutional networks, the vision transformer backbone foregoes explicit downsampling operations after an initial image embedding has been computed and maintains a representation with constant dimensionality throughout all processing stages. It furthermore has a global receptive field at every stage. These properties are especially advantageous for dense prediction tasks as they naturally lead to fine-grained and globally coherent predictions.

In some embodiments, the convolutional decoder of the 3D estimator 308 specifically assembles a set of tokens into image-like feature representations at various resolutions. The feature representations are progressively fused into the final dense prediction. In some embodiments, there is a three-stage Reassemble operation to recover image-like representations from the output tokens of arbitrary layers of the transformer encoder:

$$\text{Reassemble}_s^{\hat{D}}(t) = (\text{Resample} \circ \text{Concantenate} \circ \text{Read})(t)$$

where s denotes the output size ratio of the recovered representation with respect to the input image, and $\hat{D}$ denotes the output feature dimension.

Particular embodiments first map the $N_p+1$ tokens to a set of $N_p$ tokens that is amenable to spatial concatenation into an image-like representation:

$$\text{Read: } \mathbb{R}^{N_p+1 \times D} \to \mathbb{R}^{N_p \times D}$$

This operation is essentially responsible for appropriately handling the readout token. Since the readout token does not serve a clear purpose for the task of dense prediction, but could potentially still be useful to capture and distribute global information, some embodiments evaluate three different variants of this mapping:

$$\text{Read}_{ignore}(t)\{t_1, \ldots, t_{N_p}\}$$

simply ignores the readout token, $$\text{Read}_{add}(t) = \{t_1+t_0, \ldots, t_{N_p}+t_0\}$$

passes the information from the readout token to all other tokens by adding the representations, and $$\text{Read}_{proj}(t) = \{mlp(cat(t_1,t_0)), \ldots, mlp(cat(t_{N_p},t_0))\}$$

passes information to the other tokens by concatenating the readout to all other tokens before projecting the representation to the original feature dimension D using a linear layer followed by a GELU non-linearity.

After a Read block, the resulting $N_p$ tokens can be reshaped into an image-like representation by placing each token according to the position of the initial patch in the image. Formally, some embodiments apply a spatial concatenation operation that results in a feature map of $$\text{size } \frac{H}{p} \times \frac{W}{p}$$

with D channels:

$$\text{Concatenate: } \mathbb{R}^{N_p \times D} \to \mathbb{R}^{\frac{H}{p} \times \frac{W}{p} \times D}$$

Some embodiments finally pass this representation to a spatial resampling layer that scales the representation to $$\text{size } \frac{H}{s} \times \frac{W}{s} -$$

with $\hat{D}$ features per pixel:

$$\text{Resample}_s: \mathbb{R}\frac{H}{p} \times \frac{W}{p} \times D \rightarrow \mathbb{R}\frac{H}{s} \times \frac{W}{s} \times \hat{D}$$

Some embodiments implement this operation by first using 1×1 convolutions to project the input representation to $\hat{D}$, followed by a (strided) 3×3 convolution when x≥p, or a strided 3×3 transpose convolution when s<p, to implement spatial downsampling and upsampling operations, respectively.

Irrespective of the exact transformer backbone, some embodiments reassemble features at four different stages and four different resolutions. These embodiments assemble features from deeper layers of the transformer at lower resolution, whereas features from early layers are assembled at higher resolution. When using ViT-Large, particular embodiments reassemble tokens from layers l={5,12,18, 24}, whereas with ViT-Base, some embodiments use layers l={3,6,9,12}. Some embodiments use features from the first and second ResNet block from the embedding network and stages l={9,12} when using ViT-Hybrid. In some embodiments, the default architecture uses projection as the readout operation and produces feature maps with $\hat{D}$=256 dimensions. Such architecture is referred to as DPT-Base, DPT-Large, and DPT-Hybrid, respectively.

Particular embodiments finally combine the extracted feature maps from consecutive stages using a RefineNet-based feature fusion block and progressively up-sample the representation by a factor of two in each fusion stage. The final representation size has half the resolution of the input image. Particular embodiments attach a task-specific output head to produce the final prediction.

In some embodiments, the generator 314 or the reprojector 318 includes functionality of representing the input image 303 in 3D—the output image 315—which is beneficial for several tasks, such as novel view synthesis, relighting, object insertion with correct shadow or de-occlusions. Currently there exists no practical technology that can achieve disentangled 3D editing from 2D images on general scenes. Inverse graphics has been a very challenging problem that is intimately contingent on the fundamental problems of computer vision. Various embodiments use an off-the-shelf ML models to extract the lighting, shape, camera information. However, various embodiments are independent of the details of the off-the-shelf models, as long as they provide accurate predictions. In some embodiments, one core contribution is on formulating a synthesis model rather than perception. Model synthesis accepts a simple 3D shape (or 2D shape) as an input and then generates a larger and more complex model that resembles the input in terms of its shape and local features. Particular embodiments improve existing solutions by embedding the user's input image into a 3D representation.

In some embodiments, disentanglement refers to an unsupervised learning technique that breaks down, or disentangles, each feature in the input image 303 into narrowly defined variables and encodes them as separate dimensions, using both "high" and "low" dimension reasoning. For example, in a predictive network processing images of multiple shape dimensions, such as 3D trees, "higher dimensional" features such as leaf size and trunk appearance would be used to determine full 3D shape of tree and type. In disentangled representation, a single node, or neuron, can learn a complete feature (e.g., bark patterns) independent of other nodes if the disentangle dimensions match an output's dimensions. For example, if trying to tell the difference between a child and an adult, a node checking the disentangled vector of left leg length can discover the entire picture is a child due to parameter's max, even though that wasn't the node's objective. Conversely, in distributed representation, objects are represented by their particular location in the vector space, so the algorithm must "run its course" and run through all nodes to arrive at the output of "child."

In particular embodiments, the generator 314 generates or uses an image synthesis model that combines these 3D attributes (lighting (from 306), natural language characters (from CLIP 304), and 3D features (from 308 and 312), into a coherent, realistic image. Various embodiments are directed to an overall pipeline that enables 3D editing of 2D photos via camera, light, and text edits. In an illustrative example, some embodiments use a 3D proxy geometry to map information from the input image 303 to the output image 315. Rather than mapping the color values of the source images, some embodiments encode them using a deep convolutional network. Utilizing the proxy geometry, some embodiments map the encoded features from the input image 303 into the output image 315 (or multidimensional space representing the output image 315) and blend them via a second network. Since real world objects indicated in the output image 315 can deviate significantly from corresponding objects in the input image 303 (e.g., because an object is represented at a different angle), some embodiments use a recurrent blending network that is invariant to the number of input images, for example.

In another example, in some embodiments, the generator 314 alternatively or additionally uses a modified HoloGAN. A HoloGAN an unsupervised generative image model that learns representations of 3D objects that are not only explicit in 3D but also semantically expressive. Such representations can be learnt directly from unlabeled natural images. Unlike other GAN models, HoloGAN employs both 3D and 2D features for generating images. This modified model first learns a 3D representation, which is then transformed to a target pose, projected to 2D features, and rendered to generate the final image (315). This model learns perspective projection and rendering of 3D features from scratch using a projection unit. This architecture enables the model to learn 3D representations directly from the input image 303 for which there are no good hand-crafted differentiable renderers. To generate new views of the same scene as the input image 303, some embodiments directly apply 3D rigid-body transformations to the learnt 3D features, and visualize the results using the neural renderer that is jointly trained. This has been shown to produce sharper results than performing 3D transformations in high-dimensional latent vector space.

Figure 4:
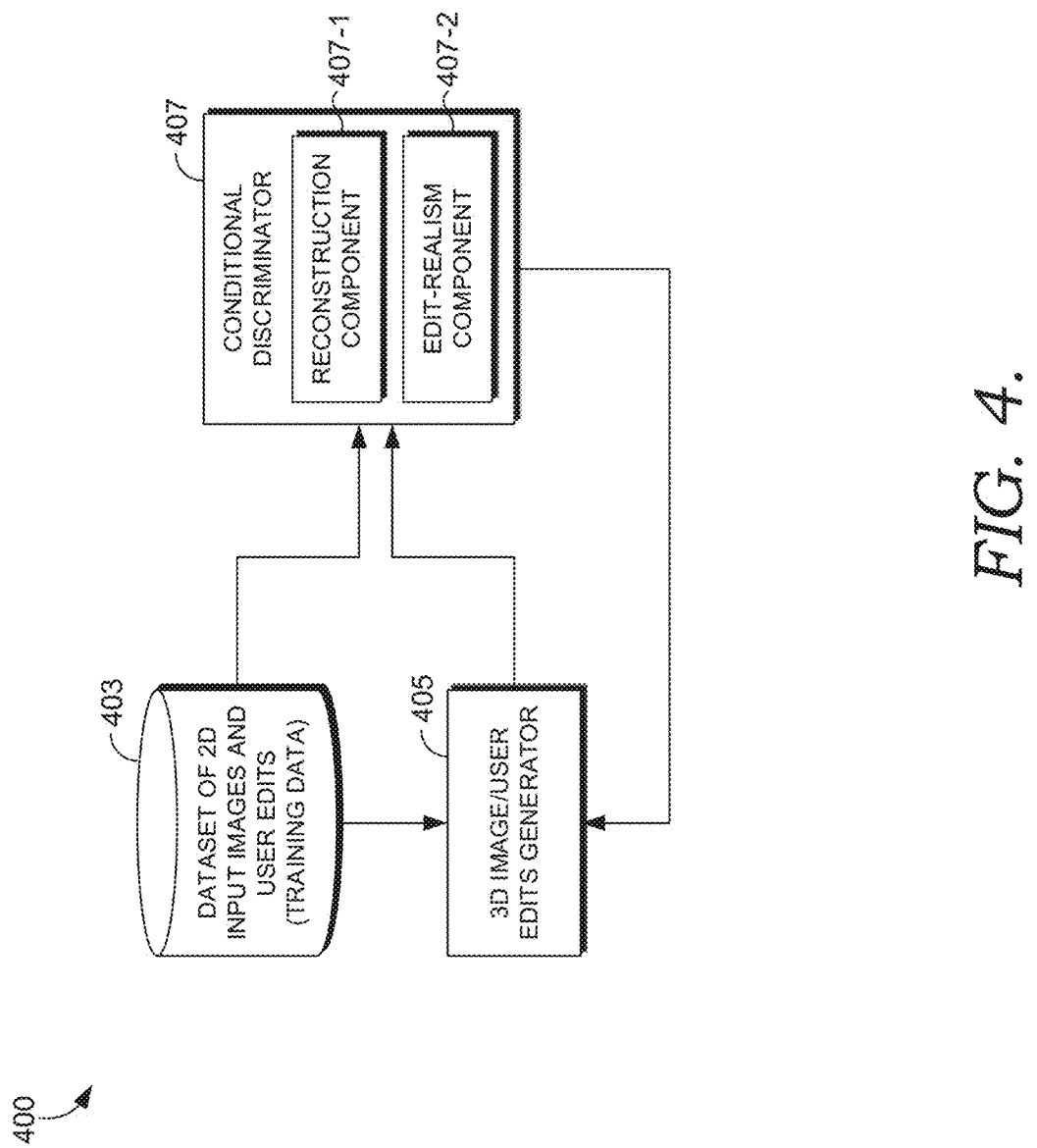
FIG. 4. is a schematic diagram of a modified Generative Adversarial Network (GAN) for use in training to generate output images that closely reflect input images and 3D user edits, according to some embodiments.

Turning now to FIG. 4, a schematic diagram of a modified Generative Adversarial Network (GAN) 400 for use in training to generate output images that closely reflect input images and 3D user edits, according to some embodiments. The modified GAN 400 includes a set of neural networks—the 3D image/user edits generator 405 (a first neural network), the conditional discriminator 407 (a second neural network), and a dataset of both 2D input images and user edits, which together represent training data. In some embodiments, a "user edit" as described with respect to FIG. 4 refers to an automated value change request the represents a real user edit but is not an actual user edit request. In some embodiments, such user edit comes in the form of a natural language or string request (e.g., "change scent to sunny" where scene was originally taken at night) or numerical form (e.g., light intensity, saturation level, camera angle), etc. In some embodiments, the 3D image/user edits generator 405 represents the generator 314 of FIG. 3, the 3D image producing model/layer 214 of FIG. 2, and/or the 3D image producer 114 of FIG. 1.

With respect to training the modified GAN 400, at high level, the 3D/user edits generator 405 automatically generates one or more potential user edits and generates corresponding output image, and runs the image editing pipeline. Then particular embodiments enforce various losses to ensure that the output images are realistic images by respecting or conforming to the edits, and are able to reconstruct the input image if no edits are given.

Describe below are nomenclature descriptions for corresponding mathematical representations. At any given training iteration, given input image x and simulated editing attributes $l_{edit}$, $c_{edit}$, $t_{edit}$ for lighting (e.g., received by the editing component 106-1), camera pose/angle (e.g., received by the editing component 108-1), and text embedding (e.g., corresponding to a natural language character user input received by the editing component 104-1), respectively. The CLIP (e.g., CLIP 304), lighting (e.g., light estimator 306) and 3D estimators (e.g., 308) are referred to as $E_{CLIP}$, $E_{light}$ and $E_{3D}$ respectively. The feature extractor (e.g., 312) is called $E_{feat}$. The 3D image/user edits generator 405 is called G. Lastly, the conditional discriminator 407 is used to enforce realism, called D.

Reconstruction loss. Without any user edits, and in some embodiments, the 3D image/user edits generator 405 takes extracted attributes and the 3D features and should be able to faithfully reconstruct an output image that reflects an input image from 403. For example, if a 2D input image contained a forest scene, the generator 405 should be able to reconstruct (e.g., in 3 dimensions) the same forest scene. To this end, the reconstruction component 407-1 minimizes the perceptual distance between the input image (e.g., a 2D image) and output image (e.g., a 3D image) when there is no editing.

$$\mathcal{L}_{rec} = \text{LPIPS}(G(E_{CLIP}(x), E_{light}(x), E_{feat}(x), E_{3D}(x)), x),$$

where LPIPS is the perceptual loss.

Edit-Realism loss. When there is editing via user edits, the goal is for the output image to become a realistic image that faithfully follows or otherwise conforms to the user edit attributes (also referred to herein as parameters). To this end, particular embodiments employ the edit-realism component 407-2, which takes the user edits as auxiliary inputs as well as the RGB image (i.e., the input image). In this formulation, the edited attributes can be used as helpful clues for the conditional discriminator 407 to detect fake images:

$$x_{out} = G(E_{CLIP}(x) + t_{edit}, E_{light}(x) + l_{edit}, \text{reproj}(E_{feat}(x), E_{3D}(x) + c_{edit})),$$

$$\mathcal{L}_{GAN} = \text{GAN}(x_{out}),$$

where GAN is the non-saturating GAN loss in a StyleGAN network, and reproj is the reprojection operator.

Attribute-consistency loss. Additionally, some embodiments also enforce a specific attribute or parameter prediction of the output image matches that of the edited attribute (a specific user edit). That is, $$\mathcal{L}_{light} = \|E_{light}(x) + l_{edit} - E_{light}(x_{out})\|^2$$

$$\mathcal{L}_{CLIP} = \|E_{CLIP}(x) + t_{edit} - E_{CLIP}(x_{out})\|^2$$

Final Loss and implementation. In some embodiments, the final loss for the generator 405 is the combination of all losses mentioned above. In some embodiments, the discriminator 407 is trained using its own GAN loss on both real and fake images, following the implementation details of StyleGAN2, including the lazy R1-regularization and equalized learning rate.

Automatic generation of user edits. At training time, the generator 405 simulates possible user edits on each editable attribute. For example, a user edit can include a user request to change the angle of lighting or camera view. In general, particular embodiments collect the attributes on the training images 403, and run PCA on them. The PCA gives manipulation directions that represent typical variations on the dataset. Then particular embodiments randomly sample an edit direction by taking linear combination of the top-k principal axes, using randomized coefficients.

In general, the 3D image/user edits generator 405 is generally responsible for iteratively generating synthetic or "fake" output images until a fake image is selected for the output by meeting one or more certain thresholds (loss level thresholds) set by the conditional discriminator 407. The generator 405 iteratively and incrementally generates data indicative of output images and user edits until it fools (e.g., is within a loss threshold set by) the conditional discriminator 407, at which point the corresponding output image is outputted. For example, the generator 405 can take, as input, a 2D image and requested user edits and iteratively generate 3D images until they resemble the 2D image (as determined via the reconstruction component 407-1) and conform to the user edits (as determined via the edit-realism component 407-2).

In generating these fake images, and in some embodiments, the generator 405 learns the distribution of classes or clusters that represent specific user edits and features of the input images in the dataset 403. For example, the generator 405 is trained on the dataset of images 403, where images can be labeled as "fake" (1) or "real" (0) and/or "lighting value X" (1) or "not lighting value X" (0). The generator 405 can then learn features associated with each of these labels so that it knows how to iteratively apply data indicative of features of input images or user edits of the user.

In some embodiments, the generator 405 is built by selecting an input Z, which may be a random number between 0 and 1 (e.g., 0.7). This input may be a feature vector that comes from a fixed distribution. Z may then be multiplied by each learned weight, which indicates the learned feature or pixel values and pixel value orientations (coordinates) for the particular images, user edits, and/or whether or not the particular image is real. In some embodiments, each pixel in an image is represented by a value (e.g., from 0 to 1), where the value itself and the orientation of the pixels are representative of whether or not there are certain features present (and/or how much data representing the feature is present). In this way, the generator 405 can incrementally, for example, adjust individual pixel values (along with sigmoid) until these values fool the personal conditional discriminator 407 by generating pixel values and/or positions within an acceptable threshold or range that the discriminator 407 is aware of. At a high level, what this means is that a well-trained generator 405 will always generate output images that reflect input images and conform to user edits but may do so with varying degrees of pixel values.

The conditional discriminator 407 is generally responsible for determining, predicting, or estimating whether the images generated by the generator 405 match 2D input images and reflect user edits based on comparing the generated fake images to the dataset 403. For instance, the dataset 403 may include a first dataset where each image includes a first set of user edits and a second dataset where each image does not include these user edits. In some embodiments, the conditional discriminator 407 determines whether an image generated by the generator 405 comes from the first data set or the second dataset (even though it is a fake image). In some embodiments, the conditional discriminator 409 may determine that the generated image is fake or does not come from the dataset 403. In some embodiments, such comparison is based on determining the distance (e.g., Euclidian) between feature vectors representing specific input images or user edits.

In some embodiments, the determination of whether an image is real or fake (whether the output image reflects a 2D input image and/or conforms to user edits requests) includes determining whether the pixels are outside of an orientation or position threshold. For example, if pixel values representing a first camera angle are applied by the generator 405, to an image, but a user edit indicates a second camera angle, this can be outside of a position threshold (e.g., as determined via homography-based functionality or object detection), and the conditional discriminator 409 can thus determine that the image is fake (e.g., based on the images in the dataset of images 403 differing over a distance threshold). Alternatively or additionally, in some embodiments, the determination of whether an image is real or not includes determining whether a pixel value generated by the generator 405 is outside of a color or brightness threshold. For example, a pixel value may be indicative of an albedo or color that is over a brightness threshold (e.g., based on the images in the dataset of images 403 differing over a distance threshold).

Alternatively, or additionally, in some embodiments, the determination of whether an image is real or fake includes determining whether a pixel value is outside of a resolution threshold (e.g., relative to other pixels of the same image or based on the images in the dataset 403 differing over a distance threshold). For example, pixel values generated by the generator 405 may be grainy at a low resolution, whereas an input image or user edits may be clear at a high-resolution value. Accordingly, the discriminator 409 can determine that the corresponding output image is fake.

Alternatively, or additionally, in some embodiments, the determination of whether an image is real or fake includes determining whether pixel values representing reflectance properties is outside of a threshold (e.g., relative to other pixel values representing the same image or based on the images in the dataset 403 differing over a distance threshold). For example, some embodiments use machine learning models to capture the real word facial or other body surface's Spatially-varying Bidirectional Reflectance Distribution Function (SVBRDF). Models, such as U-nets, or GANS, can capture the BRDF of pixel values and compare them between input and output images. If there is a discrepancy outside of a threshold, then the conditional discriminator 409 can determine that the image is fake. For example, pixels representing highlights on a person's face may be in a different orientation or value in an output image relative to highlights in the same person's face in an input image, indicating that the light source is different between the hair and the face. Based on this inconsistency, the discriminator 409 can determine that the output image is fake, and that the output image does not reflect the input image.

In some embodiments, the discriminator 409 adds values representing individual pixel values at a specific orientation indicative of user edits and/or the input image and subtracts values representing pixel values at a specific orientation indicative of non-conformance to the user edits and/or the input image. Various embodiments can then set any suitable threshold value to indicate whether a certain image is real/not real based on whether it reflects the input image and/or whether it conforms to the user edits. For example, if the summed values are greater than or equal to 1, the user's edits may be present relative to values less than 1, which may mean that the user edits were not followed. In neural networks, and in some embodiments, each neural network node represents a particular pixel of an image and its value. In this way, and using the example above, all the pixel values can be multiplied or added by plus 1 (e.g., a user edit present) or −1 (e.g., a user edit not present) for a final aggregation score. Some embodiments use a sigmoid function (a function that converts high numbers to numbers close to 1 and low numbers to numbers close to 0) to get a sigmoid of the output, which represents the probability that a user edit has been applied/is present or is fake.

Various embodiments train the modified GAN 400 to get the best possible weights (e.g., values that closely resemble pixel values of user edits and input images). This can be done via an error function (e.g., log loss or cross entropy loss), which a mechanism to tell the modified GAN 400 how it is performing. If the error is large, the modified GAN 400 is not performing well and therefore performs more training epochs until it improves. For instance, if the ground truth represented by a label 1 indicative of a certain user edits, and a prediction is made of 0.1, when it was supposed to be around 1, retraining may occur.

In some embodiments, training occurs via backpropagation by calculating the prediction and then error of that prediction. Then embodiments can take the derivative of the error based on the weights using, for example, the chain rule. This tells the model the quantity or magnitude each weight should be adjusted in order to best decrease the error using gradient descent. In response to this process, the generator 405 and the conditional discriminator 407 can be trained. Suitable error functions can be placed in suitable locations. At a first training forward pass, the weights can be defined as random numbers. Then Z can be generated, which serves as an input to the generator 405. As embodiments perform the first forward pass on the generator 405, the output image may likely be fake or not indicative of an input image/user edits since the weights are random. Various embodiments pass this generated image through the conditional discriminator 407. This discriminator 407 outputs a probability to define the correct error functions. For example, if the label of a generated image is 0 (e.g., no user edit 1), but the discriminator 407 makes a prediction 0.54, this means that the discriminator 407 is not highly confident that the image does contains the specific user edit 1. Responsively, an error loss function (e.g., log loss) can be applied to get the prediction closer to 0. However, the generator 405's goal is to use the loss of the discriminator 407 as an objective function to modify parameters or weights of its model in order to maximize the loss of the discriminator 407. Using the example, above, the goal is to get the discriminator 407 to output a 1 instead of a 0. In this way, the loss from the discriminator 407 is passed to the generator 405 so that the generator 405 can maximize the loss (or get an incorrect prediction) of the discriminator 407.

In some embodiments, the error loss function of the discriminator 407 is: $E=-\ln(1-D(x))$, where D is the output of prediction of the discriminator 407. In some embodiments, the error loss function of the generator 405 is $E=-\ln(D(G(z)))$, where G is the output or prediction of the generator 405.

The derivatives of these two error loss functions can help the model update the weights of the generator 405 and the conditional discriminator 407 in order to improve a particular prediction. Accordingly, the tension or adversarial nature between these components adjusts weights in the respective models, such that there is no collision. This process can be repeated many times during training. After various iterations or epochs, the generator 405 will be trained to generate output images with pixel values that closely resemble the input images and closely resemble the user edits based on meeting loss thresholds of the conditional discriminator 407.

In some embodiments, at runtime or when a model is deployed after training, the generator 405 generates actual output images and because it has been trained with the correct losses, it outputs images with data representing the input image and actual/real user edits in a manner that looks realistic. This is because it generates optimal pixel values inside an acceptable threshold determined by the conditional discriminator 407 (i.e., the generator 405 fools the conditional discriminator 407).

Figure 5:
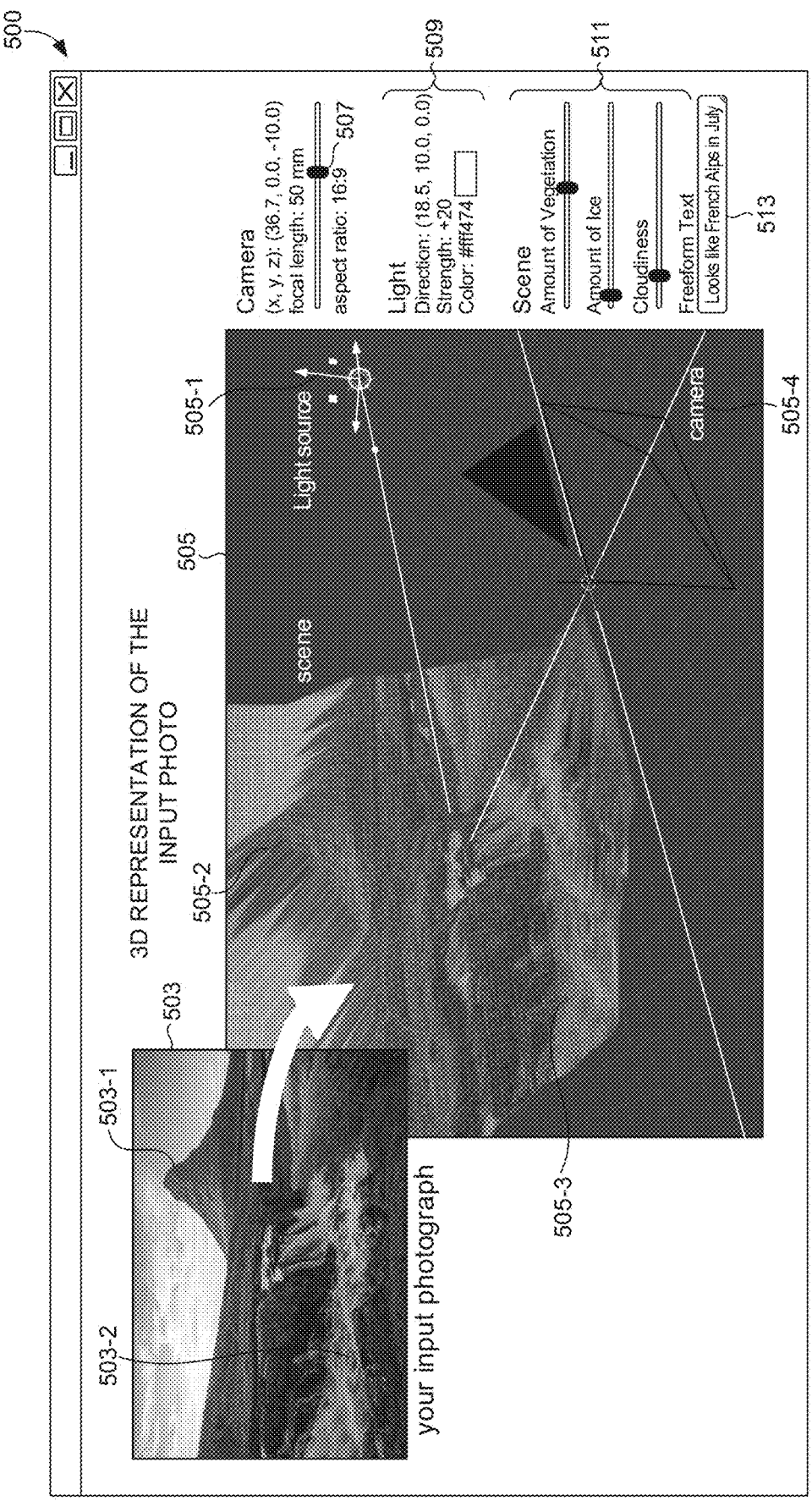
FIG. 5 is a screenshot of an example user interface for editing an image, according to some embodiments.

FIG. 5 is a screenshot 500 of an example user interface for editing an image, according to some embodiments. In some embodiments, the screenshot 500 represents what is caused to be displayed by the presentation module 120 of FIG. 1, in response to functionality performed by the 2D image conversion module 102, the text-description-image associator 104, the light estimator 106, the 3D shape estimator 1082, the pixel-level feature extractor 112, and the 3D image producer 114-1.

At a first time, particular embodiments receive the input photograph 503. In some embodiments, the input photograph represents the 2D input image 203 or the input image 303. For example, a consumer application may prompt a user to upload an image, such as via a button. In response to receiving an indication that the user has selected the button, particular embodiments communicate with operating system dialogue boxes or other operating system shell components in order to browse locally stored images. In response to receiving an indication of a user selection of the input photograph 503, particular embodiments cause presentation of the input photograph 503.

In response to receiving an indication of a user upload of the input photograph 503 or other user selection (e.g., to edit the input photograph 503), in some embodiments, the encoding stage 350 is initiated and completed. For example, in response to receiving an indication that the input photograph 503 has been uploaded, the 2D image conversion module 102 converts (or otherwise generates) the input photograph 503 into corresponding vectors, the text description-image associator 104 extracts a natural language description of the input photograph 503, the light estimator 106-1 extracts the lighting pixel values from the input photograph 503, the 3D shape estimator estimates what the features (mountains and waterfall) would look like in three-dimensions), the pixel-level feature extractor 112 extracts more granular details, such as the amount of vegetation, the cloudiness or the like in the input photograph 503, and/or the 3D image producer 114 generates the corresponding 3D representation 505 and responsively causes presentation of such 3D representation 505.

Subsequent to the upload of the input photograph 503 or the generation of the output 3D representation 505, particular embodiments receive one or more indications of one or more user edits via the slider UI elements 507 or 511, a selection via 509, 505-1, and/or receiving the natural language characters within the text field 513. In some embodiments, processing the one or more user edits represents handling the edit request 230 of FIG. 2, the editing stage 360 of FIG. 3, or the editing components 104-1, 106-1, or 108-1. As described herein, particular embodiments use a ML model design that enables editing 2D photographs (e.g., 503) in 3D space. In some embodiments, these models decompose the input image 503 into camera pose or angel (corresponding to 508), lighting condition (corresponding to 509), and the scene content (corresponding to 511), each of which is independently editable via user edits.

With respect to the text field 513, in response to receiving an indication that the user has entered in the natural language characters of "looks like French Alps in July," (a first user edit request) the model (e.g., the text description-image model/layer 204 or the CLIP model 304) finds an output image scene transformation that matches (e.g., is within a threshold distance of) or conforms to the natural language characters. For example, the "French Alps" contain many pointed mountains, yet there is a set of pixels 503-1 representing only a single mountain in the input photograph 503. Accordingly, at the output image 505, particular embodiments warp or otherwise change pixel values 503-1 that represent the single mountain to include other pixel values 505 representing additional mountains, as illustrated in the output image 505, while at the same time keeping the pixel values 503-2 and 505-3 the same in both the input photograph 503 and the output image 505. Accordingly, particular embodiments can add or change additional pixel values, warp original pixel values, or the like, which conform to the natural language request. Such functionality is difficult to achieve with manual editing of a mesh. For example, consider an input image that contains a cat, which the user desires to change to a dog. Typically, a user would have to manually move the vertices and edges representing the cat and make it look like a dog, which would consume a significant amount of computing resources and time. However, particular embodiments would be able to a process user natural language character request that says, "change to a dog" and automatically change the cat to a dog via a modified GAN, such as described with respect to 400, via previous training sessions.

In response to receiving an indication that the user has moved the slider 507 or the camera indicator 505-4, particular embodiments (such as described with respect to the editing component 108-1) responsively change the X, Y, and/or Z camera angle such that the output image 505 now represents the features of the input image 503, except at a different angle. A "camera angle" as described herein refers to a certain X, Y, and/or Z view point from the perspective of a real or imagined camera. The camera angle marks the specific location at which the camera is placed to capture an image of one or more real world features. A camera angle also refers to the angle between a camera that captured an image and one or more objects located in the image. For example, a first camera angle may be a front view of a first face of a box. A requested second camera angle may be a side view of the box, such that a second face of the box is now visible, instead of the first face. Accordingly, output images can add and/or remove pixels to indicate camera angles of different objects have changed.

In some embodiments, camera angle also has a bearing on or is otherwise associated with focal length and/or aspect ratio. As illustrated in the screenshot 500, the user can also change other camera parameters, such as focal length and aspect ratio. Lens focal length indicates the angle of view—how much of the scene will be captured—and the magnification—how large individual elements will be, such as a zoom level. Technically, focal length is the distance, in millimeters, between the optical center of the lens and the camera's sensor (or film plane), which is indicative of a zoom level of an object. Aspect ratio of an image is the ratio of its width to its height, and is typically expressed with two numbers separated by a colon (e.g., 16:9).

In response to receiving an indication that the user has input or selected a lighting parameter via 509 or the light source indicator 505-1, particular embodiments (such as described with respect to the editing component 106-1) responsively change the X, Y, and/or Z light source angle such that the output image 505 now represents the features of the input image 503, except with different shading pixel values representing a change in the light source direction. A "lighting angle" refers to the angle between a light source (e.g., the sun or light bulb) indicated an image and one or more objects located in the image. For example, in response to receiving an indication that the user has dragged the light source indicator 505-1 (which represents the location of a particular light source) from a first position to a second position, particular embodiments change pixels representing the shadows, lighting, or other reflectance properties, as described, for example, with respect to estimating a real word object surface's Spatially-varying Bidirectional Reflectance Distribution Function (SVBRDF) based on where the light source indicator 505-1 is dragged to in 3D space. In some embodiments, the lighting parameters can include actual color or albedo properties (e.g., green versus blue) or color strength (e.g., brightness).

In response to receiving an indication that the user has engaged one or more of the sliders in 511, particular embodiments change the amount or quantity of specific content and/or the dimensions of content (e.g., from 2D to 3D) located in the input photograph 503 or the generated output image 505. For example, in response to receiving an indication that the user has requested more vegetation via sliding the slider element 511 to the right, particular embodiments add (e.g., as described with respect to the editing component of the pixel-level feature extractor 112) more green pixel values an in an extra depth dimension indicative of more vegetation around the waterfall 505-3 with an added depth dimension. This same concept applies to the amount of ice and cloudiness, as illustrated in 511. A slide of a slider UI element to the right directly and proportionately adds more of the corresponding content, whereas a slide of the slider UI element to the left directly and proportionately removes more of the corresponding content.

Exemplary Flow Diagrams

Figure 6:
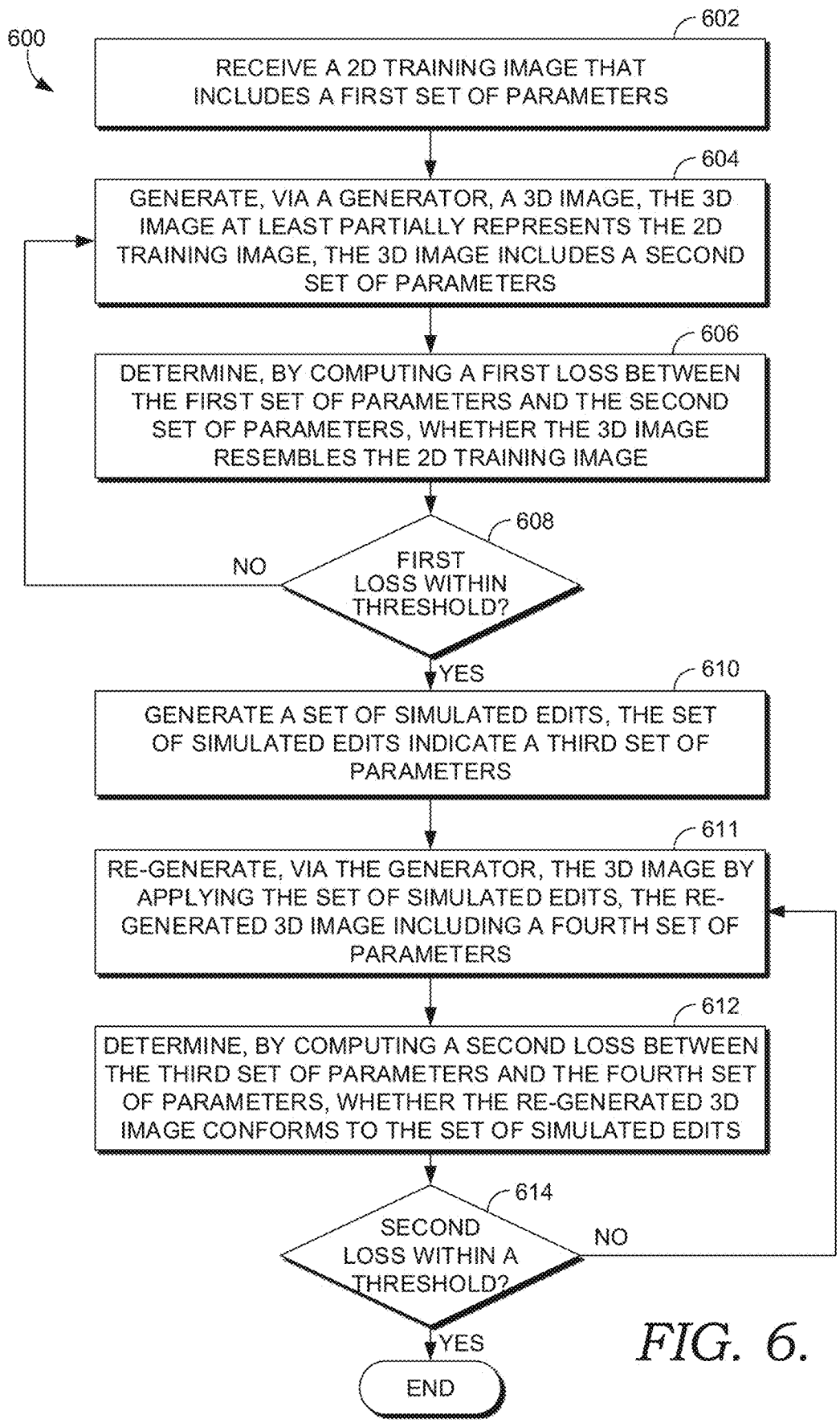
FIG. 6 is a flow diagram of an example process for training one or more machine learning models, according to some embodiments.

FIG. 6 is a flow diagram of an example process 600 for training one or more machine learning models, according to some embodiments. The process 600 (and/or any of the functionality described herein (e.g., process 700)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 600, 700, and/or any other functionality described herein.

In some embodiments, the process 600 represents the functionality performed by the training component 114-2 of FIG. 1 and/or the modified GAN 400 of FIG. 4. In some embodiments, any blocks of the process 600 can additionally include any of the functionality as described with respect to the training component 114-2 of FIG. 1 and/or the modified GAN 400 of FIG. 4. Per block 602, some embodiments receive a 2D training image (as indicated in the dataset 403) that includes a first set of parameters. For example, the training image can include one or more lighting, camera angle, or natural language description parameter values of a rain forest scene.

Per block 604, a generator generates a multidimensional image, where the multidimensional image at least partially represents the 2D training image, and where the multidimensional image includes a second set of parameters. For example, the 3D image/user edits generator 405 generates a candidate output image that includes similar rain forest scene lighting and camera angle parameters, except that the scene is in three-dimensions.

Per block 606, some embodiments determine, by computing, via a conditional discriminator, a first loss between the first set of parameters and the second set of parameters, whether the multidimensional image resembles the 2D training image. For example, such first loss can be the loss described with respect to the reconstruction component 407-1. In an illustrative example, the conditional discriminator can compare a vector embedding that indicates lighting angle in the 2D image with a vector embedding that indicates the lighting angle in the multidimensional image and responsively compute a distance between the embeddings to compute a loss.

Per block 608, particular embodiments determine whether the first loss is within a threshold (e.g., an acceptable loss value). If the loss is not at an acceptable threshold, more training iterations and epochs need to occur such that the generator repeats block 604 until a multidimensional image is generated that resembles the 2D training image within an acceptable loss threshold.

Per block 610, particular embodiments generate a set of simulated edits, where the set of simulated edits indicate a third set of parameters. "Simulated edits" as described herein refer to automated change requests that simulate or resemble actual user edits, but are not actually user edits. For example, embodiments may generate a tuple that includes X, Y, Z coordinate values (the third set of parameters) of a light source, which corresponds to a request to change the light source angle at the multidimensional image (and/or input training image) to the X, Y, Z coordinates. Another simulated edit example is X, Y, Z coordinate values (the third set of parameters) of a camera angle, which corresponds to a request to change the camera angle at the multidimensional image (and/or the input training image) to the X, Y, Z coordinates.

Per block 611, the generator re-generates the multidimensional image by applying the set of simulated edits, where the re-generated multidimensional image includes a fourth set of parameters. For example, using the illustration above, embodiments regenerate the multidimensional image by re-generating lighting and shadow features (the fourth set of parameters) indicative of the light source being at X, Y, Z coordinate values, which corresponds to the request to change the light source angle at the multidimensional image (and/or input training image) to the X, Y, Z coordinates.

Per block 612, some embodiments determine, via the conditional discriminator and by computing a second loss between the third set of parameters and the fourth set of parameters, whether the re-generated multidimensional image conforms to the set of simulated edits. For example, such second loss can be the loss described with respect to the edit realism component 407-2. In an illustrative example, the conditional discriminator can compare a vector embedding that indicates lighting angle in the re-generated multidimensional image with a vector embedding that indicates the edits that specify the lighting angle to be at specific X, Y, and Z coordinates and responsively compute a distance between the embeddings to compute a loss.

Per block 614, particular embodiments determine whether the second loss is within a threshold (e.g., an acceptable loss value). If the loss is not at an acceptable threshold, more training iterations and epochs need to occur such that the generator repeats block 611 until a multidimensional image is generated that conforms to the simulated edits within an acceptable loss threshold.

Figure 7:
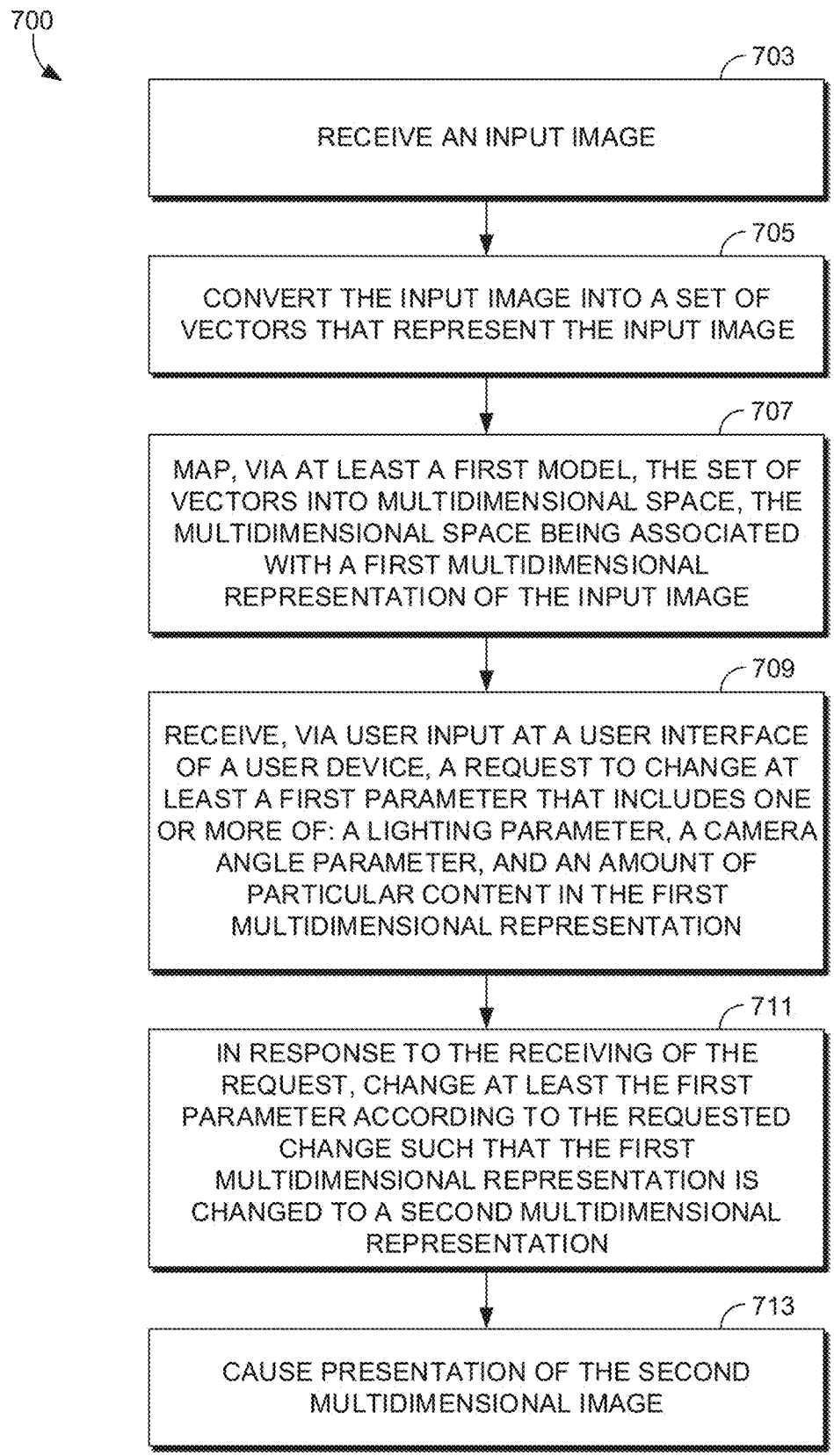
FIG. 7 is a flow diagram of an example process for changing a parameter of an input image or corresponding multidimensional representation based on a user request, according to some embodiments.

FIG. 7 is a flow diagram of an example process 700 for changing a parameter of an input image or its multidimensional representation based on a user request, according to some embodiments. In some embodiments, the process 700 represents a runtime process, where one or more machine learning models have already been trained (according to the process 600) and have been deployed in order to execute user requests. For example, prior to the receiving of the input image at block 703, some embodiments train a modified GAN according to the process 600 of FIG. 6, where the modified GAN is used in the process 700.

Per block 703, some embodiments receive an input image (e.g., a first image). An "input image" as described herein refers to a visual representation of one or more portions of the real world in two or less dimensions, such as a 2D photograph that is initially input or provided for further processing by one or more models or functionality. For example, an input image can be a digital photograph, a digital image among a sequence of video segments, a graphic image file (e.g., JPEG, PNG, etc.), a picture (or sub-element of a picture), and/or a bitmap among other things. 2D photographs typically include two dimensions depicted as length and width and the objects on the picture are flat even though they may represent more than 2 dimensions. In some embodiments, a processor executing the 2D image conversion module 102 performs block 703 to receive a 2D image.

Per block 705, some embodiments convert the input image into a set of vectors that represent the input image. In some embodiments, block 705 includes the functionality as described with respect to the 2D image conversion module 102 of FIG. 1. In some embodiments "converting" the input image includes generating the set of vectors that represent the input image without changing the input image at all. In some embodiments, the term "set of vectors" as described herein refers to one or more feature vectors. A "feature vector" as described herein may include one or more real numbers, such as a series of floating values or integers (for example, [0, 1, 0, 0]) that represent one or more other real numbers, a natural language (for example, English) word and/or other character sequence (for example, a symbol (for example, @, !, #), a phrase, and/or sentence, etc.). Such natural language words and/or character sequences correspond to the set of features and are encoded or converted into corresponding feature vectors so that computers can process the corresponding extracted features.

Per block 707, some embodiments map, via at least a first model (e.g., the modified GAN 400 of FIG. 4), the set of vectors into multidimensional space, where the multidimensional space corresponds to (or is associated with) a first multidimensional representation of the input image. In some embodiments, block 707 includes the functionality as described with respect to the mapping component 114-1 of FIG. 1, the generator 314 of FIG. 3, and/or the functionality described with respect to the 3D image producing model/layer 214. For example, some embodiments map the set of vectors in 2D Cartesian space to projective space via one or more matrices, where the projective space is the multidimensional representation, as described herein. A "multidimensional representation" or "multidimensional image," (e.g., a 3D or 4D photograph) as described herein refers to or indicates an image or portion of an image that contains content that is represented in additional dimensions and/or points of view or different dimensions and/or points of view, relative to the input image. 3D images, for example, add a depth (Z) dimension, whereas 2D images portray only horizontal and vertical (X and Y) dimensions. This third dimension allows for rotation and visualization from multiple perspectives. For example, a 2D input image may include pixels representing a first face of a six-sided box. The multidimensional representation may include: additional pixels representing the first face and second face, or other pixels representing the second face but not the first face. In another example, the input image may be a 2D image of a Cat and the multidimensional representation may be a 3D image of the same cat.

In some embodiments, a displayed multidimensional representation looks identical to the input image from the perspective of the user, but it has been mapped to multidimensional space, which may not be visible to the user. For example, referring back to FIG. 5, the output image 505 may initially look identical to the input photograph 503 when it is first loaded until the user requests edits to be made in order to adjust parameters of the image 505. In some embodiments, the displayed multidimensional representation initially looks different from the perspective of the user. For example, referring again to FIG. 5, the output image 505 may be displayed in a different camera angle when uploaded relative to the input image 503 before any user edit requests.

In some embodiments, the mapping at block 707 additionally or alternatively includes generating (or changing) a text embedding via the first model to capture textual details of the input image. In some embodiments, this includes functionality as described with respect to the text description—image associator 104 of FIG. 1, the text description—image model/layer 204 of FIG. 2, and/or the CLIP model 304 of FIG. 3. In some embodiments, such mapping at block 707 additionally or alternatively includes generating (or changing) a light estimation embedding via a second model to estimate lighting of the input image. In some embodiments, this includes functionality as described with respect to the light estimator 106 of FIG. 1, the light estimation model/layer 206, and/or the light estimator 306 of FIG. 3. In some embodiments, such mapping at block 707 additionally or alternatively includes generating a three-dimensional embedding via a third model to transform content of the input image into a three-dimensional representation of the content. In some embodiments, this includes functionality as described with respect to the 3D shape estimator 108 of FIG. 1, the 3D shape estimation model/layer 208 of FIG. 2, and/or the 3D estimator 308 of FIG. 3. In some embodiments, each of these embodiments is mapped to the multidimensional space. An "embedding" as described herein refers to a low-dimensional translation of a high-dimensional vector or dense numerical representations of real-world objects (or pixels representing objects) and relationships (e.g., in X, Y, Z coordinates), expressed as a vector. For example, a "lighting embedding" may indicate, in a vector, the reflectance or shadow properties of each set of pixels in an image and/or an X, Y, Z location of a light source in the 2D input image (and not contain any other information related to camera angle, geometries of objects in the input image, or the like).

In some embodiments, the mapping further includes generating, using the multidimensional space and via a fourth model that includes a generator, the multidimensional representation that conforms to parameters of the input image, where the conforming being based on training a modified Generative Adversarial Network (GAN). In some embodiments, this includes the functionality as described with respect to the 3D image producing model/layer 214, the generator 314, and/or the 3D/user edits generator 405. For example, the generator 314 generates a realistic 3D image that contains identical or similar lighting parameters as the input image based on training the generator (e.g., via the reconstruction component 407-1).

In some embodiments, the mapping described at block 707 includes any portions of the encoding stage, as described herein, such as the encoding stage 350 of FIG. 3. In some embodiments, the mapping at block 707 includes encoding, via a feature extractor component, pixel-level data into the three-dimensional embedding, where the pixel-level data represents details of real world features of the content. In some embodiments, this includes functionality as described with respect to the pixel-level feature extractor 112 of FIG. 1, the pixel-level feature extraction model/layer 212 of FIG. 2, and/or the feature extractor 312 of FIG. 3. In some embodiments, the mapping at block 707 includes or alternatively represents generating a second image that represents the input image, except that it has more dimensions (e.g., 3D) relative to the input image (e.g., 2D).

Per block 709, some embodiments receive, via user input at a user interface of a user device, a request to change at least a first parameter of the input image or multidimensional representation, where the first parameter includes one or more of: a lighting parameter, a camera angle parameter, and an amount of particular content. For example, as described with respect to FIG. 5, some embodiments receiving an indication that the user has slid the sliders 507 or 511 (corresponding to the camera angle parameter and the amount of content parameters), has moved the indicators 505-1 or 505-4 (corresponding to the lighting parameters and the camera angle parameters), or has input the natural language characters into the field 513.

Prior to the receiving of the request at block 709, in response to the mapping at block 707, some embodiments cause presentation, at the user interface of the user device, of the first multidimensional representation of the input image. For example, referring back to FIG. 5, particular embodiments cause presentation of the output image 505.

In some embodiments, such request at block 709 includes a set of natural language characters indicative of a request to change at least the first parameter of the first multidimensional representation. For example, referring back to FIG. 5, subsequent to the display of the screenshot 500, particular embodiments receive the natural language characters in the field 513, which is at least an implicit (not direct) request to change the amount of content (mountains) parameter. Such requests can either be implicit or explicit. An "explicit" request is a direct request to change a parameter in an image. For example, an explicit request may read, "change the lighting to X value . . . " or "add more snow," or "remove vegetation." An "implicit" request infers what a user desires without the user directly requesting it, as illustrated in 513, for example. In some embodiments, where the request is implicit, some embodiments determine the intent, via natural language processing, of the natural language characters, such as via CLIP or any other language models described herein. For example, some embodiments use Mask Language Modeling (MLM), Next Sentence Prediction (NSP), or any other functionality that trains pairs of labeled natural language character sequences with intents. For example, using the illustration above, the sequence "French Alps" may be a training data set that is paired with one or more images of the French Alps, which contain many mountains. And the character sequence "July" can be paired with a particular light intensity level. Accordingly, for example, with respect to the phrase "Looks like French Alps in July," the intent may be to change the picture to include multiple mountains that reflect the French Alps, as indicated in 505-2 and the particular light intensity level.

In some embodiments, the natural language characters indicate (e.g., describe or allude to) a real world feature not present in the input image and the multidimensional representation, where the request is indicative of a request to incorporate a visual representation of the real world feature into the multidimensional representation. For example, referring back to FIG. 5, the natural language characters "looks like" and "French Alps" allude to a specific request to generate (e.g., remove and/or add) pixels corresponding specific oriented mountains 505-2, which are not present in the input photograph 503. In another example, the natural language characters may say, "change the dog to a cat," where the cat is not present in the input image or multidimensional representation2, but the request is to incorporate the cat into the multidimensional representation.

Per block 711, in response to the receiving of the request (e.g., the set of natural language characters) at block 709, some embodiments change at least the first parameter according to the requested change (e.g., the set of natural language characters) such that the first multidimensional representation is changed to a second multidimensional representation. For example, referring back to FIG. 5, in response to receiving an indication that the user has dragged the light indicator 505-1, the output image 505 is changed by changing the reflectance properties (e.g., the shading and light direction) but the rest of the image content remains the same. The "second multidimensional image" in most cases is not an entirely new image, but rather the same image as the first multidimensional image, except for one or more parameters that have been changed, such as lighting, camera angle, and/or amount of content.

In some embodiments, the changing at block 711 includes any of the functionality as described with respect to the editing component 104-1, the editing component 106-1, the editing component 108-1, the changing of any of the models/layers in response to receiving an indication of the edit request 230 of FIG. 2, and/or the editing stage 360 of FIG. 3.

In some embodiments, the change in block 711 includes changing the text embedding to indicate the request and generating, via a generator, the second multidimensional representation based on the second multidimensional representation conforming to the requested change, where the conforming is based on training a machine learning model. For example, in some embodiments the training includes each of the steps 610, 611, 612, and 614 in order to generate an image that realistically matches the simulated user edits. In real time, however, there are no "simulated user edits," but actual or real user edits. Accordingly, the generator, having now been trained, can generate a realistic image that conforms to the actual user edits based on the training. In some embodiments, identical functionality can be performed for changing the light estimation embedding, three-dimensional embedding, or the pixel-level feature extraction embedding, such that a model can cause a realist match according to the requested user edits.

In some embodiments, such changing can include changing any of the embeddings described herein, such as a light estimation embedding, a three-dimensional embedding, a pixel-level feature extraction embedding, or the like, which is indicative of changing the multidimensional space. For example, particular embodiments change the feature vector values representing light intensity (at the first multidimensional representation or input image) to a second set of values representing a different light intensity according to the user request. Per block 713, some embodiments cause presentation of the second multidimensional image (e.g., based on or in response the change at block 711).

Exemplary Operating Environments

Figure 8:
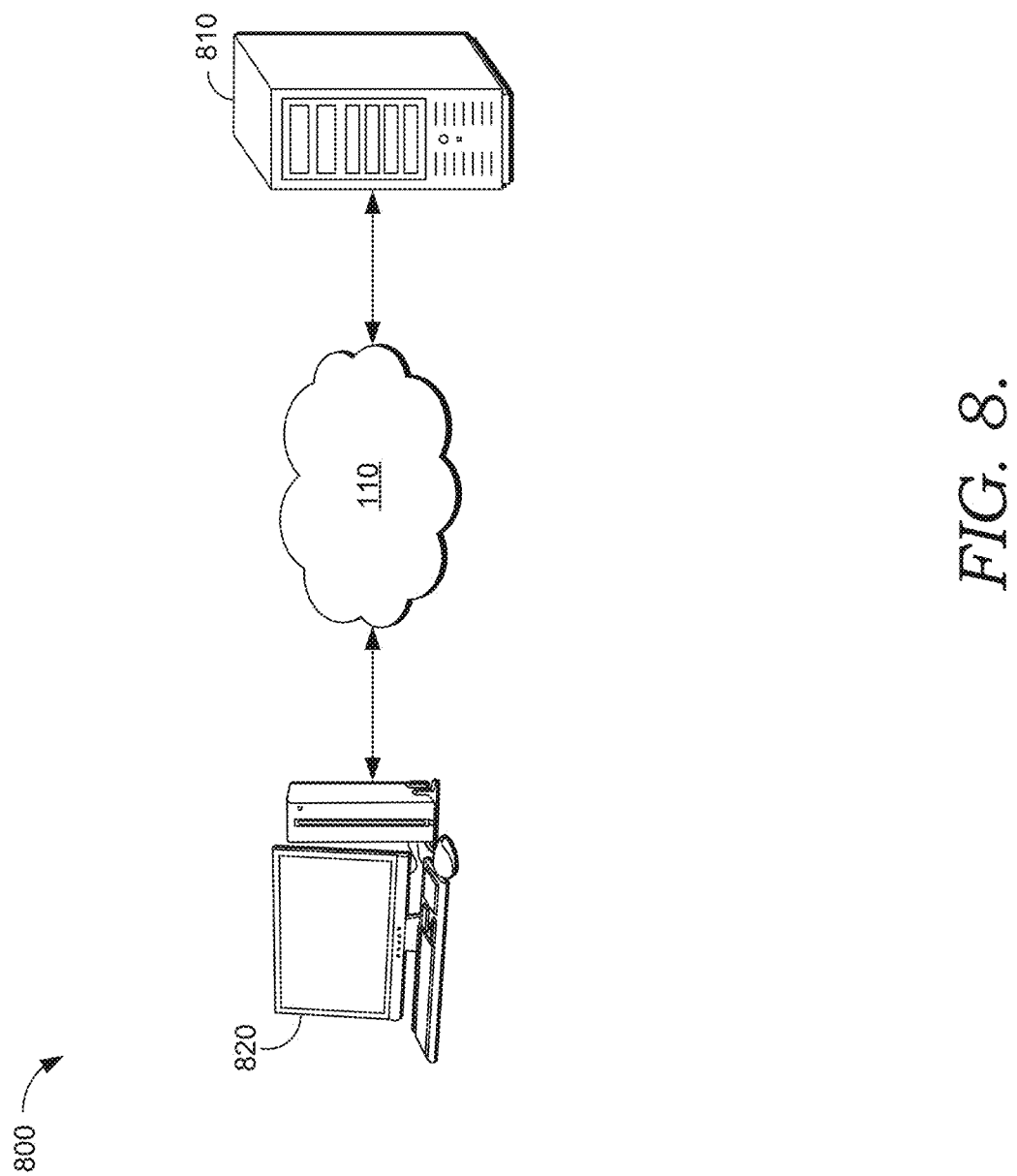
FIG. 8 is an example computer environment in which aspects of the present disclosure are employed, according to some embodiments.

Turning now to FIG. 8, a schematic depiction is provided illustrating an example computing environment 800 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 810 that represent nodes in a cloud computing network. Various functions described herein as being performed by one or more entities may be carried out by hardware, firmware, and/or software. For instance, various functions may be carried out by a processor executing instructions stored in memory.

The environment 800 depicted in FIG. 8 includes a prediction server ("server") 810 that is in communication with a network(s) 110. The environment 800 further includes a client device ("client") 820 that is also in communication with the network(s) 110. Among other things, the client 820 can communicate with the server 810 via the network(s) 110, and generate for communication, to the server 810, a request to edit a 2D or 3D image, as described herein. In various embodiments, the client 820 is embodied in a computing device, which may be referred to herein as a client device or user device, such as described with respect to the computing device 900 of FIG. 9.

In some embodiments, each component in FIG. 1 is included in the server 810 and/or the client device 820. Alternatively, in some embodiments, the components of FIG. 1 are distributed between the server 810 and client device 820.

The server 810 can receive the request communicated from the client 820, and can search for relevant data via any number of data repositories to which the server 810 can access, whether remotely or locally. A data repository can include one or more local computing devices or remote computing devices, each accessible to the server 810 directly or indirectly via network(s) 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 810 is embodied in a computing device, such as described with respect to the computing device 900 of FIG. 9.

Figure 9:
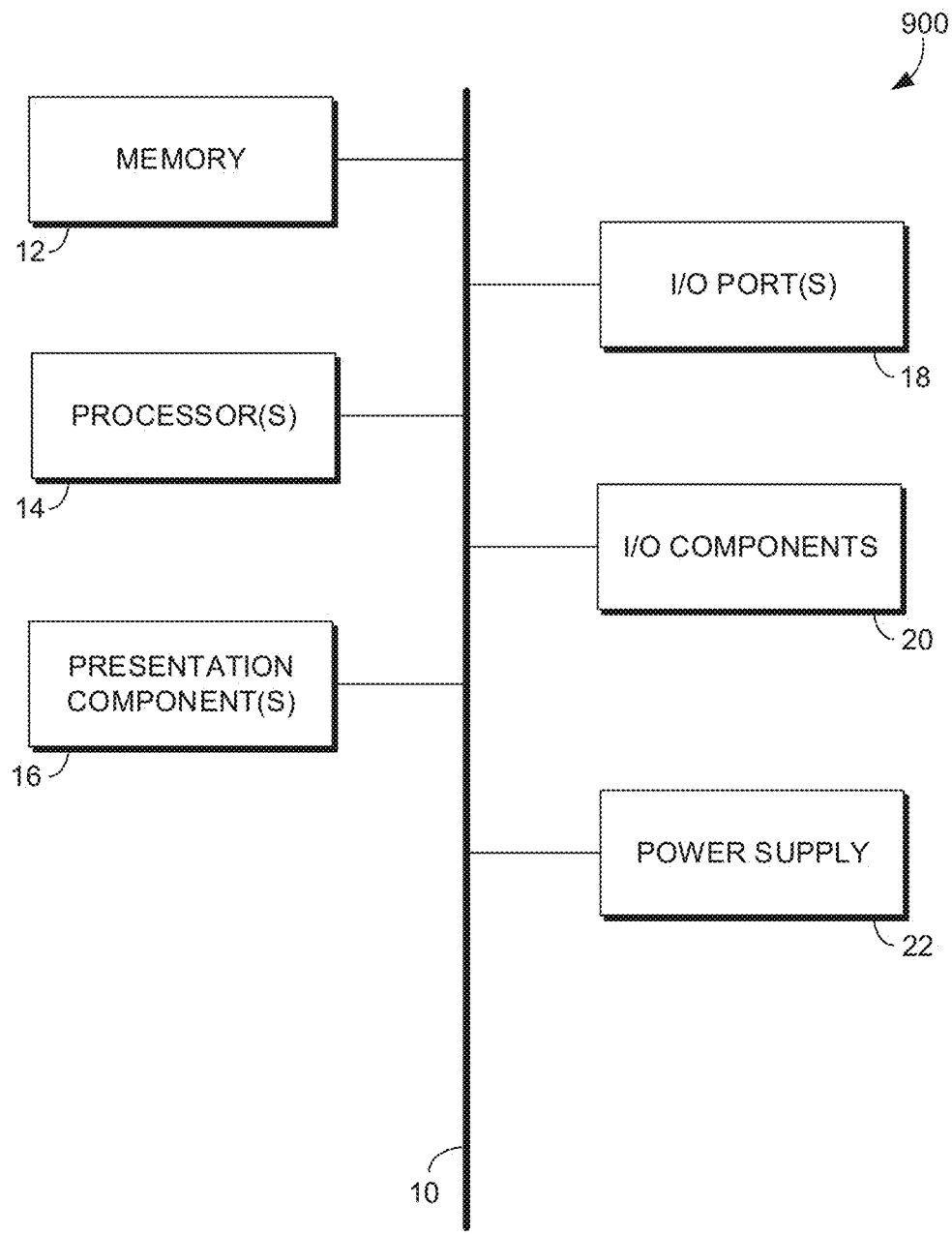
FIG. 9 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Looking now to FIG. 9, computing device 900 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 900 represents the client device 820 and/or the server 810 of FIG. 8.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 600 of FIG. 6, the process 700 of FIG. 7, and/or any functionality described with respect to FIGS. 1 through 8.

I/O ports 18 allow computing device 900 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computerized system, the system comprising:
one or more processors; and
computer storage memory having computer-executable instructions stored thereon which, when executed by the one or more processors, implement operations comprising:
receiving an input image;
converting the input image into a set of vectors that represent the input image;
mapping, via at least a first model, the set of vectors into multidimensional space, the multidimensional space being associated with a first multidimensional representation of the input image, the first multidimensional image representing content in more or different dimensions relative to the input image;
in response to the mapping, causing presentation, at a user interface of a user device, of the first multidimensional representation of the input image;
subsequent to the causing presentation, receiving, via first user input at the user interface of the user device, a set of natural language characters indicative of a request to change at least a first parameter of the first multidimensional representation; and
in response to the receiving of the set of natural language characters, change at least the first parameter of the multidimensional representation according to the set of natural language characters such that the first multidimensional representation is changed to a second multidimensional representation of the input image at the user interface.

2. The system of claim 1, wherein the method further comprises:
subsequent to the causing presentation, receiving, via at least a second user input at the user interface of the user device, a request to change at least a second parameter, the at least a second parameter including one or more of: a lighting parameter, a camera angle parameter, and an amount of particular content in the first multidimensional representation; and in response to the receiving of the request to change at least the second parameter, changing the multidimensional space according to the requested change such that the first multidimensional representation is changed to a third multidimensional representation of the input image at the user interface.

3. The system of claim 1, wherein the natural language characters indicate a real world feature not present in the input image and the first multidimensional representation, and wherein the request is indicative of a request to incorporate a visual representation of the real world feature into the first multidimensional representation.

4. The system of claim 1, wherein the mapping includes generating at least one of: a text embedding via the first model to capture textual details of the input image, a light estimation embedding via a second model to estimate lighting of the input image, and a three-dimensional embedding via a third model to transform content of the input image into a three-dimensional representation of the content, and wherein the text embedding, the light estimation embedding, and the three-dimensional embedding is mapped to the multidimensional space.

5. The system of claim 4, wherein the mapping further includes generating, using the multidimensional space and via a fourth model that includes a generator, the second multidimensional representation that conforms to parameters of the input image, the conforming being based on training a modified Generative Adversarial Network (GAN).

6. The system of claim 4, wherein the mapping further includes encoding, via a feature extractor component, pixel-level data into the three-dimensional embedding, the pixel-level data represents details of real world features of the content.

7. The system of claim 4, wherein the change of at least the first parameter according to the requested change includes changing the text embedding to indicate the request and generating, via a generator, the second multidimensional representation based on the second multidimensional representation conforming to the requested change, the conforming being based on training a machine learning model.

8. The system of claim 1, the method further comprising training, prior to the receiving of the input image, a modified Generative Adversarial Network (GAN), wherein the training includes the steps of:
receiving a 2-dimensional (2D) training image that includes a first set of parameters;
generating, via a generator, a 3-dimensional (3D) image, the 3D image at least partially represents the 2D training image, the 3D image includes a second set of parameters;
determining, by computing a loss between the first set of parameters and the second set of parameters, whether the 3D image resembles the 2D image; and
based at least in part on the computing of the loss, adjusting the GAN.

9. The system of claim 8, the method further comprising:
generating a set of simulated edits, the set of simulated edits indicate a third set of parameters;
re-generating, via the generator, the 3D image by applying the set of simulated edits, the re-generated 3D image including a fourth set of parameters; and
determining, by computing a second loss between the third set of parameters and the fourth set of parameters, whether the re-generated image conforms to the set of simulated edits, wherein the adjusting of the model is further based at least in part on the second loss.

10. A method comprising:
receiving an input image;
converting the input image into a set of vectors that represent the input image;
receiving, via first user input at a user interface of a user device, a request to change at least a first parameter of the input image, the at least a first parameter including one or more of: a lighting parameter, a camera angle parameter, and an amount of particular content;
in response to the receiving of the request, generating, by mapping the set of vectors into multidimensional space according to the request, a first multidimensional representation of the input image; and
in response to the generating of the first multidimensional representation of the input image, causing presentation, at the user device, of the first multidimensional representation.

11. The method of claim 10, wherein the user input includes a set of natural language characters indicative of a request to change at least the first parameter, and wherein the presentation at the user device of the first multidimensional representation occurs according to the set of natural language characters.

12. The method of claim 11, wherein the set natural language characters indicate a real world feature not present in the input image, and wherein the request is indicative of a request to incorporate a visual representation of the real world feature into the first multidimensional representation.

13. The method of claim 10, wherein the mapping includes generating at least one of: a text embedding via the first model to change textual details of the input image, a light estimation embedding via a second model to change lighting of the input image, and a three-dimensional embedding via a third model to transform content of the input image into a three-dimensional representation of the content, and wherein the text embedding, the light estimation embedding, and the three-dimensional embedding is mapped to the multidimensional space.

14. The method of claim 13, wherein the mapping further includes generating, using the multidimensional space and via a fourth model that includes a generator, the first multidimensional representation that conforms to parameters of the input image, the conforming being based on training a modified Generative Adversarial Network (GAN).

15. The method of claim 13, wherein the mapping includes encoding, via a feature extractor component, pixel-level data into the three-dimensional embedding, the pixel-level data represents details of real world features of the content.

16. The method of claim 10, wherein the mapping includes changing an embedding to indicate the request and generating, via a generator, the first multidimensional representation that conforms to the requested change, the conforming being based on training a machine learning model.

17. The method of claim 10, further comprising training, prior to the receiving of the input image, a modified Generative Adversarial Network (GAN), wherein the training includes the steps of:
receiving a 2-dimensional (2D) training image that includes a first set of parameters;
generating, via a generator, a 3-dimensional (3D) image, the 3D image at least partially represents the 2D training image, the 3D image includes a second set of parameters;
determining, by computing a loss between the first set of parameters and the second set of parameters, whether the 3D image resembles the 2D image; and based at least in part on the computing of the loss, adjusting the GAN.

18. The method of claim 17, further comprising:
generating a set of simulated edits, the set of simulated edits indicate a third set of parameters;
re-generating, via the generator, the 3D image by applying the set of simulated edits, the re-generated 3D image including a fourth set of parameters; and
determining, by computing a second loss between the third set of parameters and the fourth set of parameters, whether the re-generated image conforms to the set of simulated edits, wherein the adjusting of the model is further based at least in part on the second loss.

19. A computerized system comprising:
an image conversion means for receiving a first image;
an image producing means for generating, via a first model, a second image that represents the first image in more dimensions relative to the first image;
an editing component means for subsequent to the generating, receiving, via first user input at a user device, a request to change at least a first parameter of the second image to a second parameter, the at least a first parameter including one or more of: a lighting parameter, a camera angle parameter, and an amount of particular content; and based on training at least one of: the first model or a second model and in response to the receiving of the request, changing at least the first parameter to the second parameter according to the requested change such that the second image is changed to a third image, the third image also representing the first image in multiple dimensions.

20. The system of claim 19, wherein the first user input includes a set of natural language characters indicative of a request to change at least the first parameter, and wherein the changing of the first parameter to the second parameter occurs according to the set of natural language characters.

* * * * *